US012675919B2

(12) United States Patent
Marks et al.

(10) Patent No.: US 12,675,919 B2
(45) Date of Patent: Jul. 7, 2026

(54) SYSTEMS AND METHODS FOR IMAGE GENERATION USING LATENT PARAMETER-DRIVEN NEURAL MODELS

(71) Applicant: Mitsubishi Electric Research Laboratories, Inc., Cambridge, MA (US)

(72) Inventors: Tim Marks, Newton, MA (US); Rahul Dey, East Lansing, MI (US); Bernhard Egger, Erlangen (DE); Ye Wang, Andover, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 105 days.

(21) Appl. No.: 18/611,166

(22) Filed: Mar. 20, 2024

(65) Prior Publication Data

US 2025/0299377 A1     Sep. 25, 2025

(51) Int. Cl.
| | |
|---|---|
| *G06V 10/77* | (2022.01) |
| *G06N 3/045* | (2023.01) |
| *G06T 11/00* | (2006.01) |
| *G06V 10/82* | (2022.01) |
| *G06V 40/16* | (2022.01) |

(52) U.S. Cl.
CPC .............. *G06T 11/00* (2013.01); *G06N 3/045* (2023.01); *G06V 10/77* (2022.01); *G06V 10/82* (2022.01); *G06V 40/16* (2022.01); *G06T 2211/441* (2023.08)

(58) Field of Classification Search
None
See application file for complete search history.

(56) References Cited

U.S. PATENT DOCUMENTS

| | | | | |
|---|---|---|---|---|
| 2021/0264659 | A1* | 8/2021 | Kim ..................... | G06V 10/774 |
| 2022/0028139 | A1* | 1/2022 | Mitra .................. | G06V 40/175 |
| 2022/0122306 | A1* | 4/2022 | Lin ..................... | G06F 3/04845 |
| 2022/0237751 | A1* | 7/2022 | Bradley ................. | G06T 5/77 |
| 2023/0154090 | A1* | 5/2023 | Bradley ................ | G06N 3/045 |
| | | | | 345/419 |
| 2023/0186058 | A1* | 6/2023 | Partin-Vaisband ......... | |
| | | | | G06N 3/0464 |
| | | | | 706/27 |
| 2024/0104842 | A1* | 3/2024 | Nagano ................... | G06T 7/70 |
| 2024/0338868 | A1* | 10/2024 | Wang .................... | G06V 10/44 |

* cited by examiner

*Primary Examiner* — Joni Hsu

(74) *Attorney, Agent, or Firm* — Gene Vinokur

(57) ABSTRACT

An AI image processing system is provided. The system is configured to receive latent parameters defining representations of attributes of an object in an image. The latent parameters include subsets of latent parameters, and each latent parameter subset corresponds to one attribute. The system is configured to produce a joint encoding of the latent parameters and produce an implicit 3D model of the object based on the joint encoding. The implicit 3D model defines a volumetric representation for each 3D location in the scene with respect to an input viewing direction. The volumetric representation defines a signed distance value and/or an optical density, and a color and/or a feature vector. The system is configured to render a 2D image of the scene including the object viewed from the input viewing direction based on the produced volumetric representations for different 3D locations in the scene.

19 Claims, 19 Drawing Sheets

610

DETERMINE NUMERICAL VALUES OF ATTRIBUTES FROM TRAINING IMAGES OF TRAINING OBJECT USING OBJECT ENCODER

612

TRAIN IMPLICIT 3D GAN BASED ON NUMERICAL VALUES

RECEIVE DESIRED VALUE OF ATTRIBUTE TO BE MODIFIED IN IMAGE OF OBJECT

1002

DETERMINE DESIRED VALUE OF MODIFIED LATENT PARAMETER CORRESPONDING TO DESIRED VALUE OF ATTRIBUTE USING STORED MAPPING

1004

GENERATE MODIFIED IMAGE OF OBJECT BASED ON DESIRED VALUE OF MODIFIED LATENT PARAMETER

1006

1000

SYSTEMS AND METHODS FOR IMAGE GENERATION USING LATENT PARAMETER-DRIVEN NEURAL MODELS

TECHNOLOGICAL FIELD

The present disclosure generally relates to computer-generated imagery and computer vision, and more specifically to a system and method for generating two-dimensional (2D) images of three-dimensional (3D) objects.

BACKGROUND

Nowadays, image generation is used extensively in the vision and graphics communities. Faces and other 3D objects can be generated using 3D morphable models (3DMMs). For example, the FLAME model and the Basel Face Model are linear 3DMMs that can be used to synthesize a 3D model of a face, from which 2D images may be rendered. Linear 3DMMs are controllable and allow editing of certain features of the generated image in a disentangled manner. However, linear 3DMMs are limited by the correspondence assumption, which means that for any two faces modeled by the 3DMM, each point in one face corresponds to exactly one point in the other face, and vice versa. In addition, as linear 3DMMs are linear models based on principal components analysis (PCA), the faces synthesized by these models lack fine details in shape and appearance and are in general not considered photorealistic.

To address this, there has been a growth in nonlinear 3D face synthesis approaches. Nonlinear 3DMMs have higher expressivity in 3D face generation than linear 3DMMs, leading to better quality in the generated 2D face images. However, the photorealism of images generated using nonlinear 3DMMs is far inferior to the image quality generated by generative adversarial networks (GANs). 2D GANs have demonstrated the ability to generate highly realistic images by training a generator network to produce data that is indistinguishable from real samples, while a discriminator network provides feedback to guide the training process. While GAN models can generate high-quality photorealistic face images, however, GANs are black-box models with limited or no ability to independently model or modify specific attributes, such as texture, shape, illumination, hair, and other elements of the generated images.

In 3D implicit neural representations, a neural network encodes an implicit representation of a 3D scene that can be rendered using volumetric rendering. This neural network (referred to as deep implicit function neural network, hereinafter) may be trained in an unsupervised way from a set of 2D images of an object to learn an implicit representation of the 3D structure of the object that may be used to render novel 2D views of the object.

Recently, 2D style-based GANs and 3D implicit neural representations have been combined to achieve the dual benefits of photorealism (due to the incorporation of 2D style-based GANs) and the ability to learn detailed 3D object representations from 2D images (due to the incorporation of 3D implicit neural representations). Herein, we refer to these combined models as implicit 3D GANs.

Implicit 3D GANs can synthesize both the 3D structure and the high-fidelity texture of objects, such as faces. Unlike 3DMMs, implicit 3D GANs can model structures that do not follow the correspondence assumption, including highly complex structures such as hair, as well as parts of the face that are not always visible, such as the inside of the mouth.

However, existing implicit 3D GANs do not allow for controlled generation or editing of object(s) in a 3D scene, such as a 3D face. In certain cases, inversion-based approaches are used to perform a certain level of editing in generated images. However, these approaches are complicated, cumbersome, and provide limited success in photorealistic editing of images.

Accordingly, there is a need for a technical solution for generating and rendering 2D images of object(s) in a 3D scene with photorealism. More specifically, there is need for manipulating the attributes of 3D objects in 2D images, in such a way that the resulting (edited) 2D images of the objects maintain photorealism, in an efficient and feasible manner.

SUMMARY

Accordingly, it is an objective of the present disclosure to provide a system for generating and rendering 2D images of 3D objects in various scenes, with the ability to edit and control multiple attributes of the objects. An image of a 3D object is a detailed 2D rendering of the 3D object in a scene.

In recent years, there has been a significant surge in the development of high-fidelity 3D object generation techniques and 2D image generation techniques. Some embodiments of the present disclosure are based on a realization that methods such as 2D GANs that are used to synthesize photorealistic 2D images of objects have difficulty independently modifying individual attributes of the object in the image. Often, in order to modify one attribute of the rendered image, other attributes are inadvertently modified as well. The inability to change attributes of a generative model independently is known as entanglement. In 2D image generation techniques such as 2D GANs that do not incorporate a 3D model, pose is typically entangled with other attributes. E.g., it is difficult to modify the latent code that generated the image in a way that only models the 3D pose of a pictured face, without inadvertently modifying other attributes of the face in the image such as lighting, shape, texture, hair, or background.

It is an objective of some embodiments of the present disclosure to provide a system and a method for generating an editable 3D model of a face, such as a human face. For example, the face includes facial features, such as shape, size, albedo, etc. along with hair and/or parts corresponding to a head of the face. The parts of the head may correspond to, for example, top of the head, side of the head, and back of the head. To this end, the multiple facial features along with the hair and/or parts of the head may be controllable or editable using the editable 3D model. In some cases, the editable 3D model also allow to control a background of the human face.

Some embodiments of the present disclosure are based on a realization that generating 3D objects and rendering them to images, i.e., AI-generated images, has numerous practical applications in areas including AR/VR, media, fashion, advertising, medical imaging, robotics, architectural designing, marketing, avatar creation, and human-machine interaction.

Some embodiments are based on an understanding that techniques based on implicit 3D GANs, such as StyleSDF, combine the benefits of different models. In particular, implicit 3D GANs combine the benefits of 3D implicit neural representations, such as neural radiance fields (NeRFs) and signed distance fields (SDFs), with the benefits of 2D style-based generative adversarial networks (style-based GANs), such as StyleGAN and StyleGAN2. In certain cases, the implicit neural representation that is part of an implicit 3D GAN may use a tri-planar framework, which can make the 3D implicit neural representation more computationally efficient and may also lead to improved photorealism of the 2D renderings.

Although implicit 3D GAN approaches enable direct manipulation of a 3D viewpoint, they lack any explicit disentangled control over attributes (properties) of the generated objects in a generated image. In other words, while the implicit 3D GANs can generate highly realistic objects using a 3D representation, attributes of the generated objects and images cannot easily be independently edited or controlled.

Examples of these attributes include shape, albedo, illumination, pose, and background of an object in a generated image. When the object is a human face, the attributes may further include shape related to identity, shape related to facial expression, and hair attributes. The techniques for generating images of 3D objects may be applied to human faces as well as to other classes of objects, such as cars, hands, human bodies, clothing, electronic devices, and other types of objects that having varying attributes.

Some embodiments of the present disclosure are based on a recognition that existing methods for enabling editing of implicit 3D GANs lack independent semantic control over specific attributes of the face, and may also lack photorealism.

Some embodiments of the present disclosure are based on a recognition that linear and nonlinear 3D morphable models (3DMMs) have improved in terms of quality and provide some level of control over attributes of generated images. However, linear and nonlinear 3DMMs have yet to match the image quality achieved by GANs.

Some embodiments are based on recognizing a cause of the inability to control or edit attributes of the objects in the generated images. These deficiencies result, at least in part, from the principles of generative AI used for generating the 3D implicit neural representations from a latent code vector randomly sampled from a distribution. According to these principles, all attributes of a generated object in an image depend on a latent code vector, z (sampled, e.g., from a multidimensional Gaussian distribution), but there is no clear relationship between elements of the latent code and the attributes of the generated object. In an example, the latent code vector, z, and the attributes of the generated object do not have a clear relationship, as the latent code vector, z, is optimized in terms of matching the generated distribution to a training data distribution, rather than an interpretable representation.

Some embodiments are based on recognizing that in implicit 3D GANs, there is no clear relationship between a latent code vector and various attributes of images generated by the implicit 3D GAN.

Some embodiments are based on recognizing that in implicit 3D GANs, the way that a latent code vector encodes for different attributes of images may be inherently entangled (e.g., the latent code's effect on individual attributes may not be separable into linear subspaces), because the network is not optimized in terms of the separability of attributes in the latent space. However, some embodiments are based on recognizing, proved by modeling and experimentation, that the entangled latent code vector can be replaced with a plurality of latent sub-vectors, i.e., latent parameters, dedicated to different attributes. Doing in such a manner allows to control some attributes without changing others by changing only the latent parameters corresponding to the attribute of interest while reusing the latent parameters for the attributes of an object desired to preserve. Such editing and/or control generation is possible due to the ability to train the implicit 3D GAN in a disentangled manner using relationships between the latent parameters and the corresponding attributes of the object learned offline.

Some embodiments are based on a realization that methods that combine the photorealism of 2D GANs with the controllability of 3DMMs may suffer from limitations. For example, some methods use 3DMMs to learn how to control attributes of a style-based GAN, but their controllability is limited by the amount of 3D disentanglement that a 2D style-based GAN can learn. In such methods, for example, the inherent 2D nature of the style-based GAN on which they are based hampers the disentanglement of 3D pose from other attributes. One such method 3D MOrphable STyle-GAN (MOST-GAN), is a non-linear 3DMM in which a texture map is modeled using a style-based GAN (in this case, StyleGAN2) architecture. Because the 3DMM used in this method requires point-to-point correspondences across individuals, MOST-GAN enables modeling of the 3D shape and texture of faces, but it is unable to synthesize or modify the hair region in full 3D as there is no point-to-point correspondence across subjects in the hair region. Instead, MOST-GAN resorts to a 2D method for hair generation and editing, which leads to inconsistency in the hair style and hair texture across 3D pose changes.

It is an objective of some embodiments of the present disclosure to provide a method for generation and editing of images of 3D objects, or a model that combines the benefit of controllability of attributes of generated images provided by non-linear 3DMM models with the benefits of high fidelity and photorealism provided by implicit 3D GANs. We call this image generation and editing method Controllable Latent StyleSDF (or CoLa-SDF), because it enables disentangled editing of image attributes by controlling the latent code of an implicit 3D GAN model.

It is an object of some embodiments to produce a model with a disentangled latent code vector that can be used to generate 3D implicit neural representations from a set of latent parameters. In an example, a latent code vector may be partitioned into latent sub-vectors or multiple subsets of latent parameters, where each sub-vector or subset of latent parameters is responsible for a specific attribute of images rendered using the 3D implicit neural representations. For example, the model is trained to learn the disentangled latent code vector that allows modification of the image based on only a single one of or a few of the subsets of latent parameters from the multiple subsets of latent parameters corresponding to one or a few particular attributes to be changed while preserving the other attributes of the image.

To this end, an object of some embodiments is to enable modification of certain attributes of a generated image of a 3D object without generating an entirely new object and image from scratch using another randomly generated latent code vector.

According to some embodiments, predefined numerical values of multiple attributes of an object in an image are used to generate their corresponding latent parameters in the image. In an example, mappings between the attributes and their corresponding latent parameters are predefined and fixed. This predefined mapping may be based on a pretrained encoder (which maps from an image to the corresponding latent parameters) of a pretrained 3DMM. In some embodiments, this may be the encoder of a pretrained nonlinear 3DMM, such as MOST-GAN. Further, desired values of the attributes are directly mapped to the values of the latent parameters. In this manner, the model may learn to modify or control the image based on attributes using the disentangled latent codes for each of the multiple attributes. However, this approach may make it difficult to train the generative AI model, because a sampling distribution (e.g., Gaussian) used for the set of latent parameters is highly unlikely to match a population distribution of the attributes in a training dataset (e.g., the distribution of the encoded attributes determined by applying the pretrained encoder to the images in a training dataset of images). As a result, the learned generative AI model may not accurately capture the variations present in the generated image, or the attributes of the generated images may not be independently controllable via changing the corresponding subsets of the latent code of the generative AI model.

According to some embodiments, the model is configured to learn mappings between multiple attributes of an object and their corresponding latent parameters such that another deep neural network indicating the mappings is learned during generative AI model training. While this approach may be effective, it introduces additional parameters and an additional model that needs to be trained. This may cause the training to be less efficient or to fall into less optimal local minima during the training process. This may also result in the generation of an inferior controllable generative model.

According to some embodiments, mappings between a set of latent parameters and multiple attributes of an object in an image are based on a statistical analysis of a distribution of image data in a dataset. The mappings aim to capture relationships between the set of latent parameters and the multiple attributes.

Pursuant to some embodiments, mappings between numerical values of the attributes of an object and latent parameter values are determined such that a distribution of a set of latent parameters across a dataset approximately matches a known distribution (e.g., a Gaussian distribution) of the numerical values of the attributes from which it is easy to sample the set of latent parameters.

In accordance with some embodiments, mappings between numerical values of multiple attributes of an object and latent parameter values are achieved or determined by applying a principal components analysis (PCA) to a distribution of the numerical values of each attribute across a training dataset. In some embodiments, these numerical values of attributes across the training set are determined by applying the pretrained encoder of a pretrained 3DMM, such as the nonlinear 3DMM MOST-GAN, to the images in the dataset. Performing PCA on the distribution of these numerical attributes across the dataset yields a bidirectional mapping between the values of the attributes in the population and a known multidimensional Gaussian from which it is easy to sample random values. In some embodiments, PCA is applied separately to the values of each attribute or subset of attributes. For example, PCA on the distribution of the 3D shape attribute values yields a mapping between a Gaussian random vector with known covariance matrix and the distribution of the 3D shape attribute values across the training set population. In some embodiments, this Gaussian vector may be truncated, e.g., by removing a subset of the PCA basis vectors that have the smallest eigenvalues. In some implementations, by scaling each PCA basis vector by a constant determined from its eigenvalue, the covariance matrix becomes the identity matrix. Thus, by sampling from a standard multidimensional Gaussian distribution $N(0, I)$, which denotes a normal distribution whose mean is a vector of zeros and whose covariance matrix is an identity matrix, one can obtain a random sampling of values for each individual attribute (e.g., the 3D shape attribute vector) that approximately matches the population distribution of that attribute across the training dataset. This enables a generative AI model (such as the CoLa-SDF model) to be trained to reproduce the statistical distribution of the multiple attributes across the dataset, while still being able to randomly sample independently from a Gaussian latent parameter distribution for each attribute, during both training and inference of the generative AI model.

In an aspect, the present disclosure provides an artificial intelligence (AI) image processing system for generating and rendering an image of a scene including an object viewed from one or multiple viewing directions. The AI image processing system comprises at least one processor and a memory having instructions stored thereon that cause the at least one processor of the AI image processing system to receive a set of latent parameters defining representations of at least two attributes of a shape, an albedo, an illumination, a pose, and a background of the object in the image. When the object is a face, the set of attributes whose representations may be defined by the latent parameters may include hair, which may be modeled as an independent hair attribute or combined with background as a joint background/hair attribute. The set of latent parameters includes multiple subsets of latent parameters. Moreover, each latent parameter subset corresponds to one of the at least two attributes of the object in the image. The at least one processor is further configured to submit the set of latent parameters into a renderer mapping neural network trained to produce a joint encoding of the set of multiple parameters and submit the joint encoding to a deep implicit function neural network trained to produce an implicit three-dimensional (3D) model of the object given the joint encoding. The implicit 3D model defines a volumetric representation for each 3D location in the scene including the object with respect to an input viewing direction. The volumetric representation defines one or a combination of a signed distance value and an optical density, and one or a combination of a color and a feature vector. The at least one processor is further configured to submit the volumetric representations produced for different 3D locations in the scene to an image renderer configured to render a 2D image of the scene including the object viewed from the input viewing direction.

According to some embodiments, to modify an attribute of the object in the 2D image of the scene, the processor is configured to modify a latent parameter from the set of latent parameters corresponding to the attribute of the object, and generate a modified image of the object based on a combination of the modified latent parameter with the remaining unmodified latent parameters from the set of latent parameters.

According to some embodiments, to modify the attribute of the object, the processor is configured to sample a probabilistic distribution of the latent parameter corresponding to the attribute of the object to produce a random value for the modified latent parameter.

According to some embodiments, the memory stores a mapping between values of the set of latent parameters and corresponding values of the attribute of the object.

According to some embodiments, to modify the attribute of the object, the processor is configured to receive a desired value of the attribute to be modified in the image of the object and determine a desired value of the modified latent parameter corresponding to the desired value of the attribute using the stored mapping.

According to some embodiments, the mapping is based on a statistical analysis of the distribution of images in a dataset.

According to some embodiments, the mapping is derived using principal components analysis (PCA) of values of the attribute in a dataset of training images of objects of the same class as the object (e.g., faces).

According to some embodiments, the processor is configured to obtain the modified latent parameter to match parameters of an input image by using an object encoder. The object encoder (e.g., the pre-trained encoder of a pre-trained nonlinear 3DMM such as MOST-GAN) is configured to determine a numerical value or set of numerical values of the corresponding attribute in the input image.

According to some embodiments, the processor is configured to train the deep implicit function neural network using an object encoder that determines numerical values of attributes from a training image of a training object.

According to some embodiments, the processor is configured to train the deep implicit function neural network using the object encoder based on a set of parametric consistency loss functions to enforce consistency between the received set of latent parameters for generating the image of a scene and parameters that encode attributes of the rendered 2D image of the scene.

According to some embodiments, the processor is configured to train the deep implicit function neural network using the object encoder based on a set of image-based consistency loss functions to minimize a correlation between a latent parameter relating to the background of the training object and an appearance of the training object, and to minimize a correlation between a latent parameter relating to the appearance of the training object and the appearance of the background of the training object.

According to some embodiments, the object is a human head.

According to some embodiments, the processor is configured to train the deep implicit function neural network using the object encoder based on a set of image-based consistency loss functions to minimize a correlation between a latent parameter or the set of parameters relating to the background and hair of the human head and an appearance of a face, and to minimize a correlation between a latent parameter or the set of parameters relating to other attributes of the human head and the appearance of the background and hair of the human head.

According to some embodiments, the processor is configured to partition a multi-dimensional latent code of the scene into the set of latent parameters defining representations of at least two attributes of the object in the image and introduce an additional subset of latent parameters as part of the set of latent parameters. The additional subset of latent parameters define variable representation of a facial appearance factor of the human head.

According to some embodiments, the processor is configured to execute modules of the AI image processing system. The modules may include the renderer mapping neural network to generate the joint encoding based on the set of latent parameters defining representations of the at least two attributes of the object in the image. The modules may include the deep implicit neural network configured to generate one or more low-resolution images, a low-resolution feature map and a 3D shape corresponding to the object's surface, based on the input viewing direction and the joint encoding of the set of latent parameters. The modules may include an image generator configured to render a high-resolution 2D image scene, including the object viewed from the input viewing direction, from one or more of the low-resolution images, the low-resolution feature map, the 3D shape corresponding to the surface of the object, and the joint encoding of the set of latent parameters. Before being provided to the high-resolution image generator, the joint encoding of the set of latent parameters may be transformed by a mapping neural network.

According to some embodiments, the high-resolution image generator is configured to render a high-resolution 2D image of the scene including the object viewed from the input viewing direction, instead of or in addition to the 2D image of the scene rendered by the image renderer.

According to some embodiments, the shape attribute represents a three-dimensional (3D) shape of the object, and the pose attribute represents a pose of the object in 3D space, or a 3D transformation between the object pose and a camera pose.

According to some embodiments, the lighting attribute utilizes a spherical harmonics representation.

According to some embodiments, the deep implicit function neural network is a signed distance function (SDF) neural network.

According to some embodiments, the deep implicit function neural network is a neural radiance field (NeRF) neural network.

In another aspect, a method for generating and rendering an image of a scene including an object viewed from one or multiple viewing directions is provided. The method comprises receiving a set of latent parameters defining representations of at least two attributes of a shape, an albedo, an illumination, a pose, and a background of the object in the image. When the object is a human head, this list of attributes may include hair, which may be modeled as a separate hair attribute or combined with background as a joint background/hair attribute that replaces the background attribute in the list. The set of latent parameters includes multiple subsets of latent parameters. Moreover, each latent parameter subset corresponds to one of the at least two attributes of the object in the image. The method further comprises submitting the set of latent parameters into a renderer mapping neural network trained to produce a joint encoding of the set of multiple parameters. The method further comprises submitting the joint encoding to a deep implicit function neural network trained to produce, given the joint encoding, an implicit three-dimensional (3D) model of the object defining a volumetric representation for each 3D location in the scene including the object with respect to an input viewing direction. The volumetric representation defines one or a combination of a signed distance value and an optical density, and one or a combination of a color and a feature vector. The method further comprises submitting the volumetric representations produced for different 3D locations in the scene to an image renderer or image generator configured to render a 2D image of the scene including the object viewed from the input viewing direction, where the 2D image may be low-resolution or high-resolution.

In yet another aspect, a non-transitory computer readable storage medium embodied thereon a program executable by a processor for performing a method. The method comprises receiving a set of latent parameters defining representations of at least two attributes of a shape, an albedo, an illumination, a pose, and a background of the object in the image. When the object is a face, this list of attributes may include hair, which may be modeled as an independent hair attribute or combined with background as a joint background/hair attribute. The set of latent parameters includes multiple subsets of latent parameters. Moreover, each subset of latent parameters corresponds to one of the at least two attributes of the object in the image. The method further comprises submitting the set of latent parameters into a renderer mapping neural network trained to produce a joint encoding of the set of multiple parameters. The method further comprises submitting the joint encoding to a deep implicit function neural network trained to produce, given the joint encoding, an implicit three-dimensional (3D) model of the object defining a volumetric representation for each 3D location in the scene including the object with respect to an input viewing direction. The volumetric representation defines one or a combination of a signed distance value and an optical density, and one or a combination of a color and a feature vector. The method further comprises submitting the volumetric representations produced for different 3D locations in the scene to an image renderer configured to render a 2D image of the scene including the object viewed from the input viewing direction.

The image renderer may also be configured and trained to generate one or more of one or more low-resolution images, a low-resolution feature map, and a 3D shape corresponding to the object's surface, based on the input viewing direction and the joint encoding of the set of latent parameters. The modules may include a high-resolution image generator configured to render a high-resolution 2D image of the scene, including the object viewed from the input viewing direction, from one or more of the low-resolution images, the low-resolution feature map, the 3D shape, and the joint encoding of the set of latent parameters. Before being provided to the high-resolution image generator, the joint encoding of the set of latent parameters may be transformed by a mapping neural network.

As a result, some embodiments disclose an AI image processing system for generating and rendering an image of a scene including an object viewed from one or multiple viewing directions. The AI system generates an image of an object from multiple latent parameters that individually define the representation of shape, albedo, illumination, pose, and background of the object in the image. This functionality allows to modify a specific attribute of the generated image by modifying a latent parameter representing that attribute. When the object is a face, this list of attributes may include hair, which may be modeled as an independent hair attribute or combined with background as a joint background/hair attribute.

Some embodiments are based on a recognition that it is possible to train a deep implicit function neural network such that specific latent parameters of a disentangled latent code vector correspond to specific attributes of the image generated.

BRIEF DESCRIPTION OF DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1:
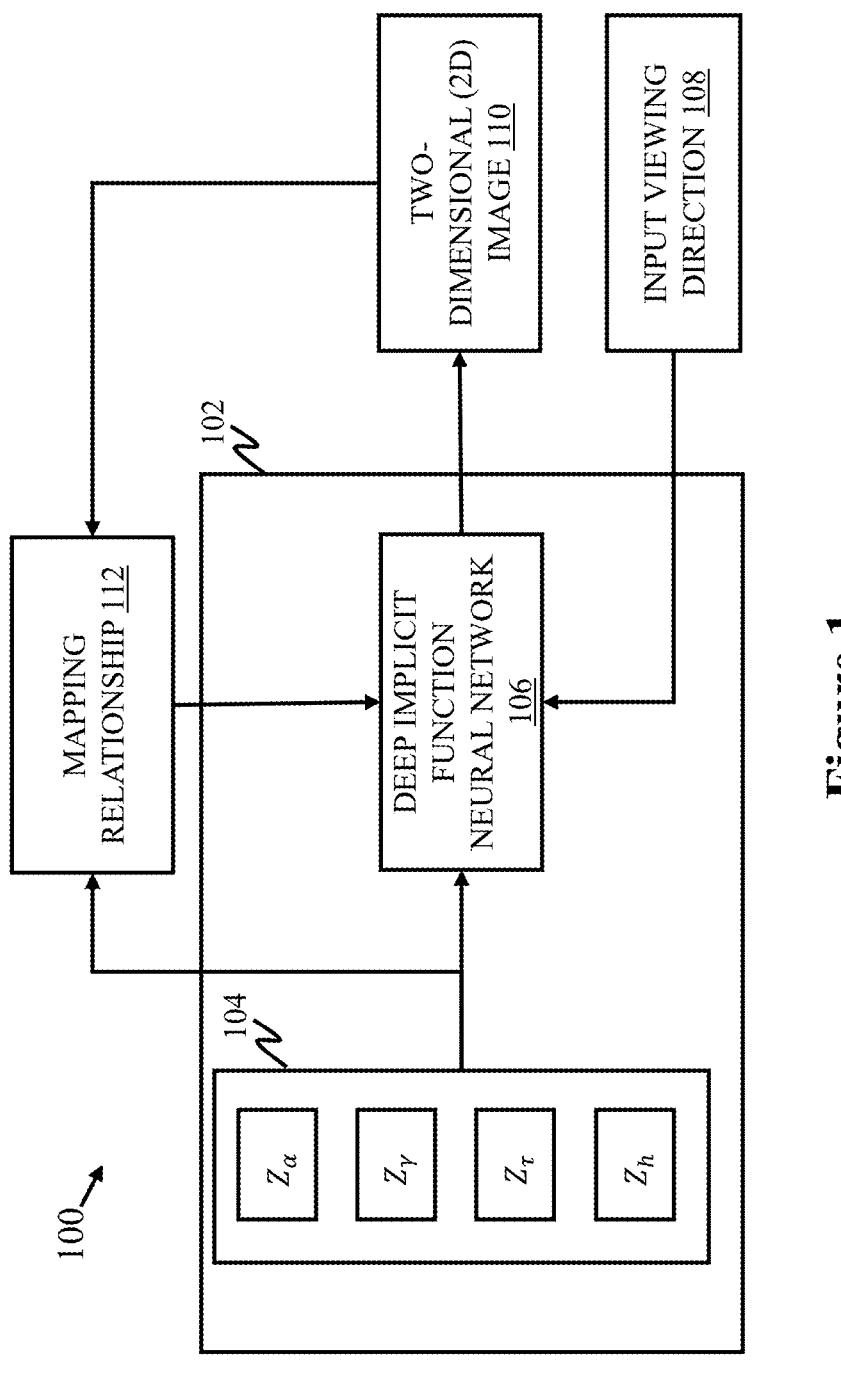
FIG. 1 shows an exemplary environment in which an artificial intelligence-based image processing system for generating an image of a scene is implemented, according to one or more embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Overview of an Example Architecture of an Artificial Intelligence (AI) Based Image Processing System The proposed AI image processing system comprises a generative AI-based model for enabling modification of a 2D output image by modifying or controlling certain attributes of the 2D output image while preserving other attributes of the 2D output image. The embodiments of the present disclosure disclose a model, namely the CoLa-SDF model, that combines the controllability of nonlinear 3D morphable models (3DMMs) with the high fidelity of implicit 3D GANs. In particular, the CoLa-SDF model enforces mappings between a latent space of attributes of an object in the 2D output image to match interpretable and physical latent parameters used for generating or editing the 2D output image.

The present disclosure enables high-fidelity image synthesis or generation and subsequent 3D manipulation with full control over the disentangled latent parameters. The 2D output image is manipulated by disentangling a latent parameter code vector into a set of latent parameters of the 2D image that corresponds to specific attributes of a 3D object pictured in the image, such as a 3D shape of the object, an albedo of the object, a pose of the object, a texture of the object, an illumination of the object, and a background of the object in the image. When the object is a face, the attributes may include hair as well. The techniques of the present disclosure are further explained in conjunction with FIGS. 1-13.

FIG. 1 shows an exemplary environment 100 in which an artificial intelligence-based image processing system 102 (referred to as system 102, hereinafter) for generating an image 110 of a scene is implemented, according to an example embodiment. The image 110 is a 2D representation of the scene. The 2D image 110 comprises a 2D visual representation of an object, the scene, or a pattern. Pursuant to present disclosure, the 2D image 110 may include a 2D representation of a 3D object in a scene. Examples of the 3D object may include, but are not limited to, human head, automobile, one or more natural objects (such as tree, forest, body of water, etc.), clothing item, architectural element (such as house, bridge, building, etc.), food item, and the like.

Pursuant to present disclosure, the system 102 is configured to generate new or synthetic images using artificial intelligence algorithms. In another example, the system 102 is configured to create an image with predefined desired attributes. Further, the system 102 allows to change or modify any particular attribute of the generated 2D image 110 in order to generate desired images.

The 2D image 110 is composed of a grid of picture elements, known as pixels. Moreover, each pixel contains information about certain attributes of the 3D object in the image 110. In certain cases, the 2D image 110 can be represented as a matrix where each element (or pixel) in the matrix corresponds to a specific location in the image 110 and holds values representing its attributes.

The image 110 represents multiple physical attributes of the 3D object that may have to be modified to obtain a desired image of the 3D object and/or the scene. In some example embodiments, the multiple physical attributes of the object may include, but are not limited to, shape, albedo, texture, pose, illumination, or lighting, pose, and background. In an example, the pixels of the image 110 may indicate numerical values of each of the attributes for the 3D object for corresponding locations in the 2D image 110.

Some embodiments are based on a recognition that a 3D scene contains one or more 3D objects. Further, an objective of the present disclosure is to generate high-resolution synthetic or real image of a 3D object in a scene. In this regard, implicit 3D models may represent objects and scenes through parameters of a neural network. In an example, the implicit 3D models may use neural radiance fields (NeRFs) to represent objects, such that density and radiance of 3D points are queried through the network and rendered to an image using volume rendering. In another example, the implicit 3D models may use signed distance fields instead of density fields to represent the object surfaces. However, NeRFs and SDF models may be fitted only to a given scene and are not generative in nature. Furthermore, while these methods are able to generate 3D scenes that can be rendered to view-consistent images, high computational cost may prevent them from generating high-resolution images in a cost-effective or time-efficient manner.

In certain cases, the image generation of 3D objects may be accomplished using 3D morphable models (3DMMs), which are highly controllable models that may be used to generate images with controllable attributes. In an example, a 3DMM of an object, such as faces, is a parametric 3D model that enable explicit control over semantic attributes of the object such as shape and albedo. 3DMMs may also be used to control the pose of 3D objects. However, the images generated by 3DMMs lack photorealism, fine details of appearance, and expressivity.

Non-linear 3DMMs can provide improved expressivity and photorealism. However, generation quality of 3DMM models is not good as that of generative adversarial networks, and they have limited modeling of certain aspects of 3D objects. For example, when the 3D object is a face or human head, 3DMMs have limited modeling of hair and teeth since these features lack pointwise correspondence across subjects and are not part of the underlying 3DMM model.

Alternatively, implicit 3D generative adversarial network (GAN) models can be used to generate images with high quality photorealism. The implicit 3D GAN models combine 3D implicit neural representation models (which enable learning detailed 3D object representations from 2D images) with style-based GAN models (which enable generating images of novel synthetic objects from a class with high photorealism). However, existing implicit 3D GAN models do not allow for controlling specific attributes of the object for image editing and/or image generation.

The embodiments of the present disclosure are based on a realization that the existing implicit 3D GAN models fail to support controllability of specific attributes, as a latent code vector used to generate images is entangled. Implicit 3D GANs are trained to produce synthetic data whose distribution is similar to that of a training set, but the dataset used during training is not partitioned according to attribute values (which are typically unlabeled), and any attribute values are not involved during training. Since a relationship between the attributes of the image and a latent code vector are not specified during training, the relationship is entangled and difficult or impossible to interpret.

Some embodiments are also based on a realization that existing implicit 3D GANs and related methods fail to define relationships between attributes of the image and the latent code vector for generation of the image of a 3D object. To this end, the generative AI technique of the present disclosure allows to generate controllable images of various 3D objects, such as faces, automobiles, buildings, landscape, etc., in which different attributes of the objects are controlled using different parts of the latent code vector.

Further, some embodiments of the present disclosure are based on a realization that even controllable 3DMMs only provide limited controllability on modeling or editing of attributes of images for image generation and/or editing. For example, certain 3DMMs may allow modelling or controlling values of shape and texture attributes. However, they fail to allow modelling of background of a 3D object in the scene accurately. In particular, when the 3D object is a face, the 3DMMs fail to allow modeling of hair region in full 3D as there is no point-to-point correspondence across attributes in the hair region.

The present disclosure provides techniques for combining the ability of implicit 3D GAN models to learn 3D model generation from 2D images with the ability of 3DMMS to provide disentangled controllability for image generation and/or image editing.

In this regard, some embodiments are based on an understanding that independent control of particular attributes of a 3D object for image generation and/or image editing can be achieved by identifying a mapping relationship 112 different attributes of the 3D object and a Gaussian distribution of the attributes in a latent space. To this end, for generating the image 110, the mapping relationship 112 indicates mapping between attributes of the 3D object and a set of latent parameters 104. In particular, the explicit representation of each of the multiple attributes as a latent parameter subset from the set of latent parameters 104 based on the mapping relationship 112 enables manipulation of each of the attributes of the 3D object for generating the image 110 in an independent manner.

In an example, the set of latent parameters 104 define representations of the attributes of the 3D object. In this regard, a latent parameter $Z_\alpha$ may correspond to a shape attribute, $\alpha$, of the image 110, a latent parameter $Z_\gamma$ may correspond to an illumination or lighting attribute, $\gamma$, of the image 110, a latent parameter $Z_\tau$ may correspond to an albedo or texture attribute, $\tau$, of the image 110, a latent parameter $Z_h$ may correspond to a background attribute, h, of the image 110. When the object is a human head, the attribute h may represent the hair, or it may represent a combination of the hair and the background behind the head.

In an example, during a training phase, a differentiable non-linear 3DMM module is used to supervise the training of the implicit 3D GAN model in order to cause a deep implicit function neural network 106 of the system 102 to learn to use the disentangled representations for the different attributes as the set of latent parameters 104 to generate images. Details of the training phase are further described in FIG. 6A, FIG. 6B, FIG. 7 and FIG. 8.

Further, during an example inference phase, random values may be assigned to each subset of latent parameter from the set of latent parameters 104. Moreover, a desired input viewing direction 108 is received or determined. The random values for the set of latent parameters 104 along with the input viewing direction 108 are provided to the deep implicit function neural network 106. In an example, a perspective of the 3D object for the 2D image 110 is based on the input viewing direction 108. Further, the deep implicit function neural network 106 is configured to generate high-fidelity 2D image 110 of the 3D object. For example, the 2D image 110 may be a synthetic image generated based on the random values of the set of latent parameters 104.

In an example, the disentangled set of latent parameters 104 may indicate disentangled set of representations that capture factors of variation or varying attributes in a way that is independent of each other. This means that each representation should only capture one attribute of image data, and changing one representation should not affect the others. In an example, the disentangled set of representations has partitioned, or disentangled, the set of attributes of the object into individual attributes and encodes each attribute as separate dimensions.

During another example inference phase, specified values of the attributes, such as $\alpha$, $\gamma$, $\tau$, and h, for the generation of the image 110 along with the input viewing direction 108 may be provided to the deep implicit function neural network 106. Further, based on the mapping relationship 112, the set of latent parameters 104 $Z_\alpha$, $Z_\gamma$, $Z_\tau$, and $Z_h$ may be determined for the specified values. Upon determination of the set of latent parameters 104, the image 110 may be generated to have desired attributes.

It may be noted, in some cases, values for only specific attribute(s) may be defined or assigned. In such a case, the system 102 is configured to determine values for latent parameters(s) corresponding to the specific attribute(s) based on the assigned values and use random values for other latent parameters that do not have assigned attribute values. In this manner, the generated image 110 is partly controlled to have some desired attributes, while the image may exhibit other variations that are not covered by the controlled attributes. To this end, the image 110 can be controlled owing to the implicit 3D GAN that enables direct manipulation of a 3D viewpoint.

In one example, the assigned values for the specific attribute(s) may be provided to the system by providing an input image and defining which attributes from the multiple attributes of the input image are to be used for generating the image 110. For example, if a shape of a 3D object in the input image is to be used as reference for generating another image, then the input image may be encoded to determine a value of $\alpha$ for the input image. Further, the value of $\alpha$ is used to generate the latent parameter $Z_\alpha$, while random values may be used for other latent parameters to generate the image 110.

In an example, the 3D object in the image 110 can be edited by changing separate latent parameters (such as, into $Z_\alpha$, $Z_\gamma$, $Z_\tau$, and $Z_h$) from the set of latent parameters 104 for corresponding attributes (such as, $\alpha$, $\gamma$, $\tau$, and h), either independently or in various combinations. To this end, based on a change in any or a combination of the latent parameters 104, and the mapping relationship 112 between the set of latent parameters 104 and the attributes of the image 110, a modified or edited image may be generated. Subsequently, embodiments of the present disclosure replace an entangled latent code vector with a plurality of latent sub-vectors, i.e., the latent parameters $Z_\alpha$, $Z_\gamma$, $Z_\tau$, and $Z_h$, dedicated to different attributes, such as shape, albedo, illumination, and hair and/or background.

According to some embodiments, the deep implicit function neural network 106 is implemented using a Signed Distance Function (SDF)-based neural network. Alternatively, the deep implicit function neural network 106 may be implemented using Neural Radiance Field (NeRF)-based neural network. In yet another example, the deep implicit function neural network 106 is implemented using a Gaussian splatting neural network. The examples of the deep implicit function neural network 106 are only exemplary and should not be construed as a limitation. In other embodiments, other generative AI models for image generation may be utilized as the deep neural network 106 for generating the image 110.

In an example, an implicit 3D GAN, StyleSDF, is produced by merging an SDF-based 3D representation model and volume renderer with a style-based 2D generator. The SDF-based model and volume renderer render a low-resolution feature map of a 3D model of the 3D object, from which the style-based generator generates view-consistent images, i.e., the image 110. Notably, the SDF-based 3D modeling defines detailed 3D objects, leading to consistent volume rendering.

In an example, the disentangled latent sub-vectors of the latent parameters enable control of a single desired attribute while keeping other values same. In particular, the use of StyleSDF or another implicit 3D GAN trained implicitly on relationships between the latent parameters and the corresponding attributes enables the disentangled control.

Figure 2:
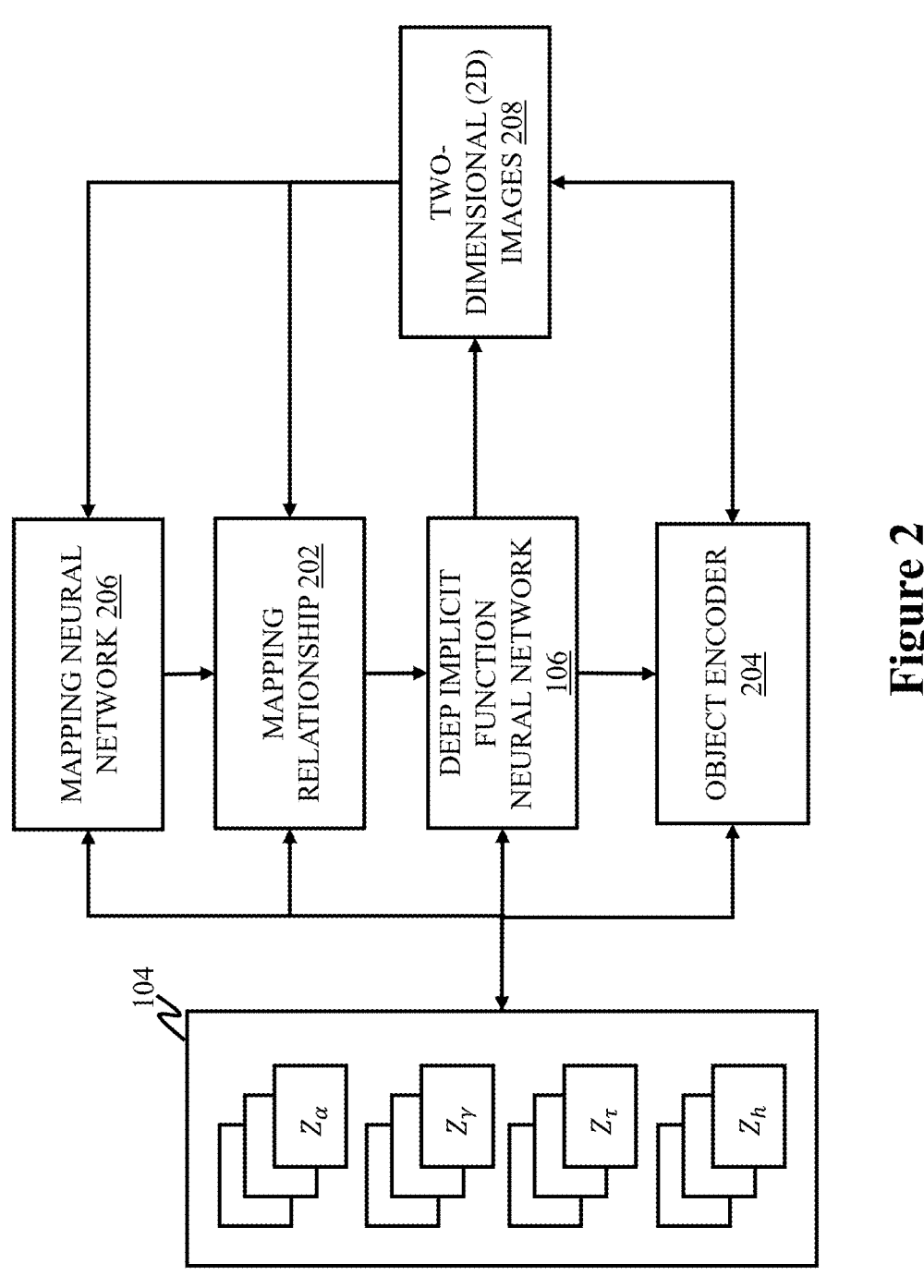
FIG. 2 shows an exemplary environment for extraction of mapping relationship, according to one or more embodiments.

Further, submit the volumetric representations produced for different 3D locations in the scene to an image renderer configured to render a 2D image of the scene including the object viewed from the input viewing direction Brief Overview of Training of Deep Implicit Function Neural Network Referring to FIG. 2, extraction of mapping relationship 202 is described, according to some embodiments. In an example, the mapping relationships 202 may be identified, determined, or extracted prior to training of the deep implicit function neural network 106 for generating images.

It may be understood, the system 102 may include different networks for different functions. For example, an object encoder 204 and a mapping neural network 206 may be used to extract the mapping relationship 202. In an example, the mapping relationship 202 may indicate mapping between representations of attributes in a latent space with numerical values of different attributes in a dataset of 2D images 208 of an object or 3D object.

According to an embodiment, the 2D images 208 in the dataset may be analyzed to extract the numerical values of the attributes from the corresponding images 208. In an example, the object encoder 204 is configured to generate a set of encodings for each image based on attributes of 3D object in the images 208. For example, the object encoder 204 is configured to determine numerical values of attributes of the object from each of the image 208. In particular, the object encoder 204 may generate the numerical values of the attributes of the 3D object (not shown) from the images 208. In an example, the object encoder 204 may be a classic encoder, or a neural network. More specifically, in an example, the object encoder 204 may be implemented using the encoder of a nonlinear 3DMM, such as the encoder of a trained MOST-GAN model. In another example, the object encoder 204 may be a linear 3DMM. In yet another example, the object encoder 204 may be implemented using a convolutional neural network (CNN). In still another example, the object encoder 204 may consist of multiple nonlinear regression functions, each trained to obtain a value of a different attribute of an object from an image of the object.

For example, the intensities or color values at each point or location in an image may be used to generate numerical values of attributes, $\alpha$, $\gamma$, $\tau$, and h, for the image. In this manner, a set of numerical values for attributes are extracted as encodings from each of the images 208 in a training set of images of objects. The distribution across the images in the training set of the numerical values of these attributes may be approximated by a gaussian distribution to reduce dimensionality and determine a mapping relationship. In this regard, the numerical values of these attributes may be converted to values of the multiple subsets, i.e., $Z_\alpha$, $Z_\gamma$, $Z_\tau$, and $Z_h$, of the set of latent parameters 104.

In an example, the numerical values of the attributes in the images 208 may have physical meaning and may have high dimensionality. These numerical values of the attributes may have to be converted into values for the set of latent parameters 104 to reduce dimensionality of the values and in order to use latent parameters that have a Gaussian distribution. In an example, values for attributes ($\alpha$, $\gamma$, $\tau$, and h) of an image are converted to a vector of a set of latent parameters, where the vector would have disentangled representations of the values of $\alpha$, $\gamma$, $\tau$, and h, contained as separate sub-vectors $Z_\alpha$, $Z_\gamma$, $Z_\tau$, and $Z_h$, respectively.

For example, for values of a particular attribute, say $\alpha$, in each of the plurality of 2D images 208, a subvector $Z_\alpha$ corresponding to each image may be determined. Further, based on variations in values of the attribute $\alpha$ across the set of images 208, a mapping relationship between $\alpha$ and $Z_\alpha$ may be determined. In an example, a Gaussian distribution of $Z_\alpha$ may be used to determine the mapping relationship for $\alpha$ and $Z_\alpha$.

In an example, the set of disentangled latent parameters 104 encode distinct aspects or attributes of the data, i.e., image data of the training images 208, into separate latent variables or parameters. As a result, consistent meaning is provided within the mapping relationship 202. In an example, the mapping neural network 206 is configured to generate the mapping relationship 202 based on the representations of the values of $\alpha$, $\gamma$, $\tau$, and h as $Z_\alpha$, $Z_\gamma$, $Z_\tau$, and $Z_h$. For example, the mapping relationship 202 may be a statistical relationship, a Gaussian relationship, a deterministic relationship, or a probabilistic relationship. For example, the mapping relationship 202 or the mapping is based on a statistical analysis of a Gaussian distribution of the attributes, particularly, latent parameters $Z_\alpha$, $Z_\gamma$, $Z_\tau$, and $Z_h$ of the attributes of the training images 208 in the dataset.

In order to learn the mapping relationship 202 for disentangled latent parameters 104, the dimensions of a latent code vector Z for representation of data in a latent space are divided into disjoint subsets. In other words, dimension of a latent code vector Z is divided into dimensions for latent parameters $Z_\alpha$, $Z_\gamma$, $Z_\tau$, and $Z_h$. In an example, the latent code vector Z may have 256 dimensions. In this case, 128 dimensions may be divided among the set of latent parameters 104 for various attributes of the images 112. For example, the 128 dimensions may be partitioned into $Z_\alpha$, $Z_\gamma$, $Z_\tau$ and $Z_h$. In some embodiments, 64 dimensions may remain not allotted so as to account for any remaining details, $Z_r$, in and around the 3D object in the training images 208, that are not accounted for by the four attributes. For example, when the 3D object is a human head, the dimensions of $Z_r$ may be used to encode fine details in the image, or background elements not covered by $Z_h$, or aspects of the images that are not encoded consistently by the object encoder. In an example, the mapping relationship 202 between values of the set of latent parameters 104 and corresponding numerical values of the attributes of the 3D object in the image 208 is stored for future inferences.

In one example, to determine a number of dimensions to be allocated to each of the attributes $Z_\alpha$, $Z_\gamma$, $Z_\tau$ and $Z_h$, eigen-decomposition may be performed over the corresponding data covariance matrices $\Sigma_\alpha$, $\Sigma_\gamma$, $\Sigma_\tau$ and $\Sigma_h$, respectively measuring the covariances of the values of the attributes $\alpha$, $\gamma$, $\tau$, and h across the set of training images 208.

Further, in an example, the mapping relationship 202 is derived using principal components analysis (PCA) to approximate the distribution of values of each attribute across the training images 208 as a Gaussian distribution of each subset of the latent parameters 104. In particular, the mapping relationship 202 is derived by using PCA for analyzing embeddings of the values of set of latent parameters 104 for the attributes in a latent space, such as a PCA space. In an example, PCA latent space of the values of each of the set of latent parameters 104 may be sampled to utilize the parametric and image-based consistency losses in the embeddings of the values. This is used to extract the mapping relationship 202 between the values of the attributes in the training images 208 and the values of the latent parameters.

In other embodiments, the mapping relationship 202 may be determined using, for example, t-distributed stochastic neighbor embedding (t-SNE) approaches, linear discriminant analysis (LDA) approaches, uniform manifold approximation and projection techniques (UMAP) approaches, and the like. Details of the PCA mapping are further described in FIG. 3.

Overview of Generating Mapping Using PCA

Figure 3:
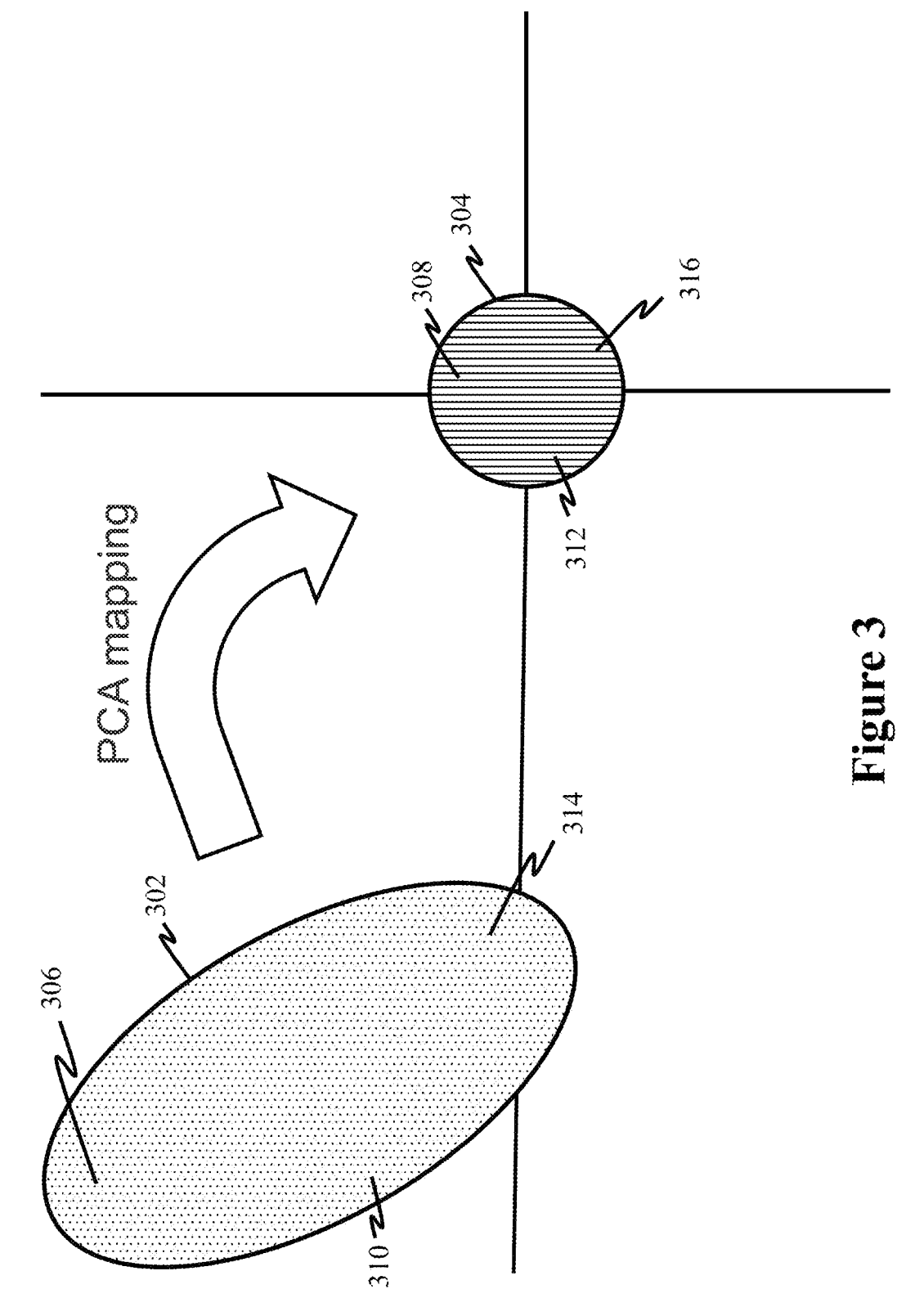
FIG. 3 illustrates a mapping between latent parameter values and attribute values of a particular attribute in an image, according to one or more embodiments.

FIG. 3 illustrates a mapping 300 between latent parameter values and attribute values of a particular attribute in an image, according to an example embodiment. Pursuant to the present example, a statistical approach, i.e., principal component analysis (PCA) approach, is utilized to generate the mapping between the latent parameter values and the values of the attribute in the image. It may be noted, the mapping of the values of the attribute with latent parameters using PCA is only exemplary and should not be construed as a limitation. Some embodiments are based on a realization that disentangled parameters of 3DMMs sampled in a PCA space can be used to achieve disentangled latent parameters for controlling attributes independently, accurately, and effectively.

It may be understood, the deep implicit function neural network 106 is trained using the object encoder 204 that determines numerical values of attributes of a training object from the images 208. For example, the deep implicit function neural network 106 learns mapping of the numerical values of the attributes (referred to as attributes values, hereinafter) with the values of latent parameter (referred to as latent parameter values) of the corresponding attributes in the PCA space using the object encoder 204. In particular, the object encoder 204 may generate the attributes values of the 3D training object (not shown) from the images 208.

In an example, the object encoder 204 is configured to generate attributes values of an image, such as the images 208 during pre-training or an input image during inference. A multidimensional distribution 302 depicts a distribution of attribute values of an attribute w of the image. In an example, the attribute values are generated by the object encoder 204. The attribute values include attribute values 306, 310 and 314 represented as samples from the multidimensional distribution 302. Further, based on a linear transformation of the attribute values 306, 310 and 314 of the attribute w in the multidimensional distribution 302, a normalized Gaussian distribution 304 of latent parameter values (depicted as latent parameter values 308, 312 and 316) is generated. The latent parameter values 308, 312 and 316 in a latent PCA space, may represent a latent parameter $Z_w$ corresponding to the attribute w. The latent parameter values 308, 312 and 316 of the latent parameter $Z_w$ are approximately represented as the normalized Gaussian distribution 304. In this manner, based on linear transformations of PCA, the attribute values 306, 310 and 314 of the attribute w are projected into the normalized Gaussian distribution 304 as latent parameter values 308, 312 and 316 in the latent space or the PCA space.

In this regard, vectors of the projections are defined by variance across the training set of the attribute values. By restricting the dimensionality of the attribute values in the PCA space to a certain number of components that account for most of the variance in the attribute values, dimensionality reduction and the latent parameter values are obtained. Based on vector values of the projections of the attribute values 306, 310 and 314 into the normalized Gaussian distribution 304, the latent parameter values 308, 312 and 316 for the attribute and corresponding to the image are generated or determined.

To this end, the PCA approaches are used to convert the values of the multiple correlated attributes of the images at each 3D location within the image into the set of linearly uncorrelated latent parameters 104. The transformed attributes or the values of the set of latent parameters 104 are referred to as principal components of the attributes. To this end, by reducing the variances or total variability in the values of the multiple attributes across the multiple 3D locations in the image, various patterns are identified. These patterns may correspond to the mapping relationship 202 or 110 between the attribute values in the image and latent parameter values corresponding to the attribute in the PCA space. To this end, the latent parameter values 308, 312 and 316 in the PCA space correspond to projections into a lower-dimensional space of the normalized Gaussian distribution 304 of the attribute values 306, 310 and 314 that are in the high-dimensional space of the multidimensional distribution 302.

In an example, a variance or total variability in values of each attribute are used to split between classes and reduce dimensionality of values of corresponding latent parameter in the PCA space.

In order to generate the values of the set of latent parameters 104 with reduced dimensionality, corresponding to the values of the attributes, the values of each of the attributes are determined using the object encoder 204. Based on the values of each of the attributes across the set of training images, a covariance matrix $\Sigma_w$ may be computed for each attribute w. Thereafter, dimensions of the values of each of the attributes to be retained are determined based on eigenvalues and eigenvectors of the resultant covariance matrix $\Sigma_w$ of each of the attributes. For example, the eigenvectors of the covariance matrix that correspond to large eigenvalues may indicate directions or dimensions in the attribute space with high information. These eigenvectors and eigenvalues for each covariance matrix $\Sigma_w$ corresponding to the attribute w are used to calculate the new values for the set of latent parameters. To this end, each latent parameter subset, i.e., $Z_\alpha$, $Z_\gamma$, $Z_\tau$, and $Z_h$ is independent from each other in the set of latent parameters 104. For example, the latent parameter values 308, 312 and 316 for each latent parameter correspond to PCA coefficients of the embedding of the latent parameter values 308, 312 and 316 in the PCA space.

Pursuant to the present example, the attribute value 306 is mapped to the latent parameter value 308, the attribute value 310 is mapped to the latent parameter value 312, and the attribute value 314 is mapped to the latent parameter value 316. Further, for example, as $Z_w \sim N(0, I)$ is desired for $w \in (\alpha, \gamma, \tau, h)$, eigen-decomposition of the values of the latent parameter is used to identify a mapping or a mapping relationship between the parameter encoding of the attribute values generated by the object encoder 204 and the corresponding latent code vector or a latent parameter value. In an example, the PCA mapping is indicated by:

$$w_{sample} = U'_w \Lambda'_w z'_w + \mu_w \qquad (1)$$

where $$U'_w$$

and $$\Lambda'_w$$

are top eigenvectors and eigenvalues, respectively, of $\Sigma_w$, and $\mu_w$ is the data mean.

Overview of an Object Encoder

Figure 4A:
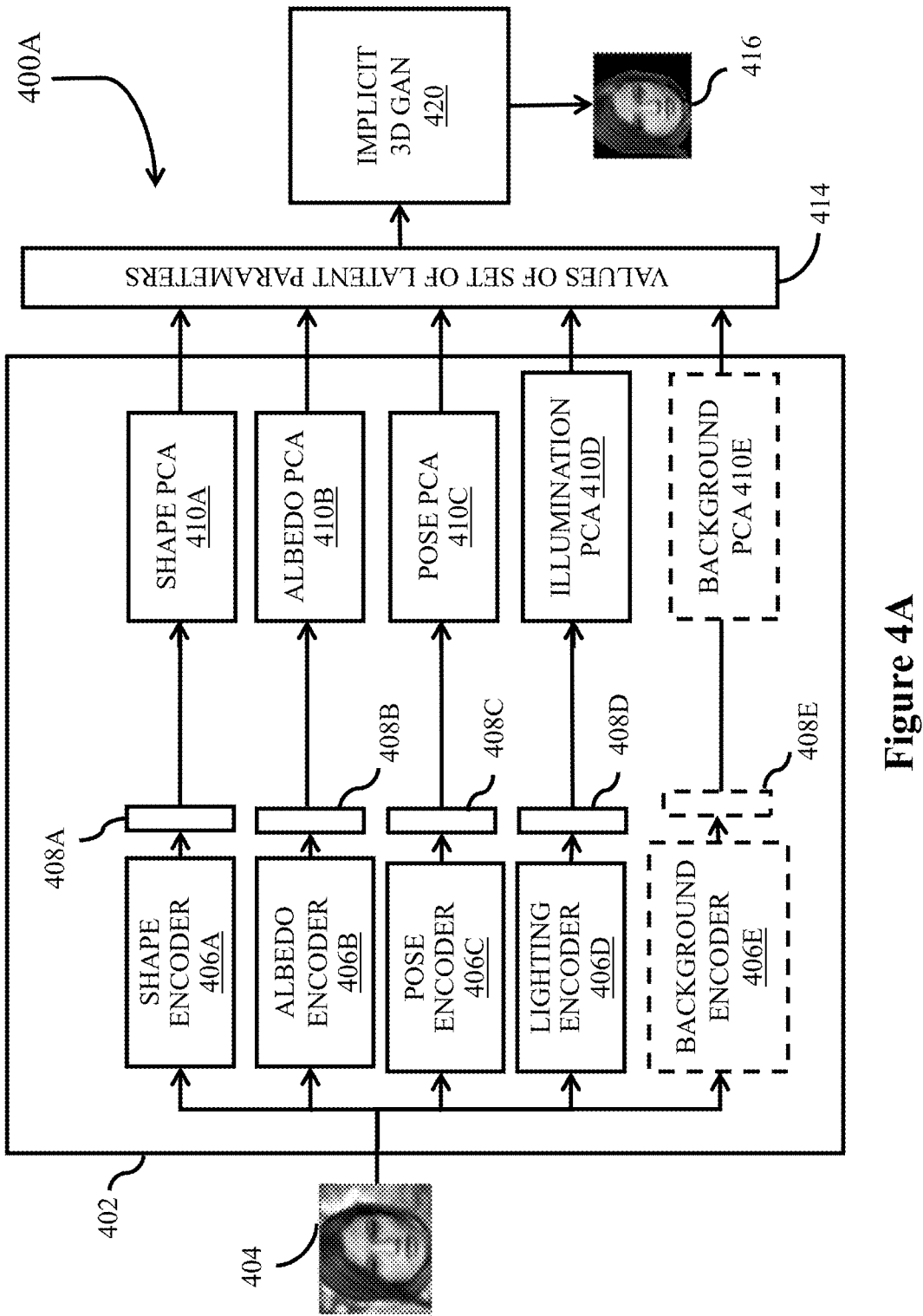
FIG. 4A shows a framework of an object encoder for generating meaningful encodings of an image, according to one or more embodiments.

FIG. 4A shows a framework 400A of the object encoder 402 for generating meaningful encodings of an image 404, according to one example embodiment of the present disclosure. In an example, the image 404 may be a training image or an inference image. During training, the encoding of the image is used to identify and extract attributes of the image for generating the mapping relationship 202. Moreover, during inference, the encoding of the image is used to identify and extract attributes of the image for generating an updated value of one or more latent parameters that needs to be changed based on the image 404. When the image 404 is received, the image 404 is submitted to the object encoder 402.

In an example, the object encoder 402 is instantiated as a neural network or collection of neural networks, which when given an image as input outputs numerical vectors that encode the shape, albedo, lighting, pose, and background. In an example, the object encoder 402 is implemented using the encoder portion of an already-trained (pre-existing) 3D Morphable StyleGAN (MOST-GAN) model, which is a nonlinear 3DMM that includes a set of encoders. To this end, the use of the MOST-GAN neural network as the object encoder 402 is only exemplary and should not be construed as a limitation. In other embodiments, the object encoder 402 may be implemented using a different regression or analysis model such as DECA (Detailed Expression Capture and Animation), MICA (MetrIC fAce), or some other model or combination of models that can provide a separate numerical encoding for each of two or more attributes of an object in an image.

In an example, only the encoders of the pre-trained MOST-GAN neural network are used to numerically encode attributes of image and further generate values of the set of latent parameters 104 corresponding to the attributes. The MOST-GAN object encoder 402 includes multiple subnetworks for disentangling the multiple physical attributes of the image 404. In some example embodiments, the multiple subnetworks correspond to encoder architectures that includes a shape encoder, $E_\alpha$, 406A, an albedo encoder, $E_\tau$, 406B, a pose encoder, $E_\theta$, 406C, a lighting or illumination encoder, $E_\gamma$, 406D, and a background encoder, $E_h$ 406E (referred to as encoders 406A-406E, hereinafter), as shown in FIG. 4A. Each of the multiple subnetworks, i.e., each of the encoders 406A-406E, processes the image 404 to extract each of the corresponding the multiple physical attributes from pixels of the image 404.

For instance, the shape encoder 406A extracts the shape attribute $\alpha$, the albedo encoder 406B extracts the albedo or texture attribute, $\tau$, the encoder pose 406C extracts the 3D pose attribute, $\theta$, the lighting encoder 406D extracts the lighting or illumination attribute, $\gamma$, or spherical harmonics illumination parameters and the background encoder 406E extract the background attributes, h.

The multiple physical attributes that are extracted from the image 404 may be represented in one or a combination of latent space and physical space of the corresponding physical property. For instance, the shape encoder 406A extracts a shape code 408A in a shape latent space, the albedo encoder 406B extracts an albedo code 408B in an albedo latent space, and the background encoder 406E extracts background features or hair features 408E in a background latent space. In contrast, the pose encoder 406C extracts a 3D pose representation 408C physical space, and the lighting encoder 406D extracts a lighting representation 408D in a physical space. Each of the shape code 408A, the albedo code 408B and the hair/background features 408E represents a compressed state of the corresponding physical property, i.e., the shape attribute and the albedo attribute.

In some example embodiments, the lighting physical space 408C or the lighting attribute may be represented using a spherical harmonic parameterization. The spherical harmonic parameterization enables recovery of a physical property corresponding to lighting illuminating the 3D object (such as the lighting 104D) of the image 404 that can approximate arbitrary unknown lighting conditions. In some example embodiments, the pose latent space 408D may correspond to a 6-degree-of-freedom (6-DOF) pose vector that includes 3 parameters for 3D rotation via an axis-angle representation and 3 parameters for a 3D translation. Subsequently, the pose attribute represents a pose of the 3D object in 3D space based on the pose vector.

In an example, when the 3D object is a human head or a face, the background encoder 406E may use the encoder portion of a hair-manipulation algorithm to extract the hair features 408E.

In an example, the shape code 408A, the albedo code 408B, the pose code 408C, the lighting code 408D, and the background code 408E are used to generate values of the set of latent parameters 414, i.e., values of the $Z_\alpha$, $Z_\gamma$, $Z_\tau$, $Z_\theta$, and $Z_h$. In an example, the values of the set of latent parameters 414 are generated based on a separate PCA performed on the values of each of the attributes, i.e., shape 410A, illumination 410D, albedo 410B, pose 410C, and background or hair 410E, respectively.

In an example, an encoder 402 may be used to generate encodings of attributes of images 404 of objects from a predetermined class. Realistic images may be generated by a generator such as an implicit 3D GAN 420 that uses the values of the set of latent parameters 414 to generate a 3D volumetric representation of the 3D object and renders the 3D volumetric representation as the output image 416. In particular, the volumetric representations are produced for different 3D locations in the scene. Further, the 3D volumetric representation is submitted or transferred to an image renderer configured to render a 2D image as the output image 416 of the scene including the object viewed from the input viewing direction. The image renderer may render the 2D output image 416 on a display device or store it for future rendering and/or analysis. For example, the display device may be a computing device, a monitor, a screen, a projector, a television, etc.

In some embodiments, one or more attributes of the images 404 may not be encoded by the encoder. In an example, the object background (and/or hair) is not encoded. In this case, the background encoder 406*e*, background code 408*e*, and background PCA 410E do not exist. In such a case, it may not be possible to use the encoder to train the implicit 3D GAN 420 so that a specific subset of the latent parameters controls the background (and/or hair) appearance. However, there may be an alternative method to train the implicit 3D GAN 420 so that a specific subset of the latent parameters controls the background (and/or hair). An example alternative method is explained below.

Overview of Architecture of Implicit 3D GAN

Figure 4B:
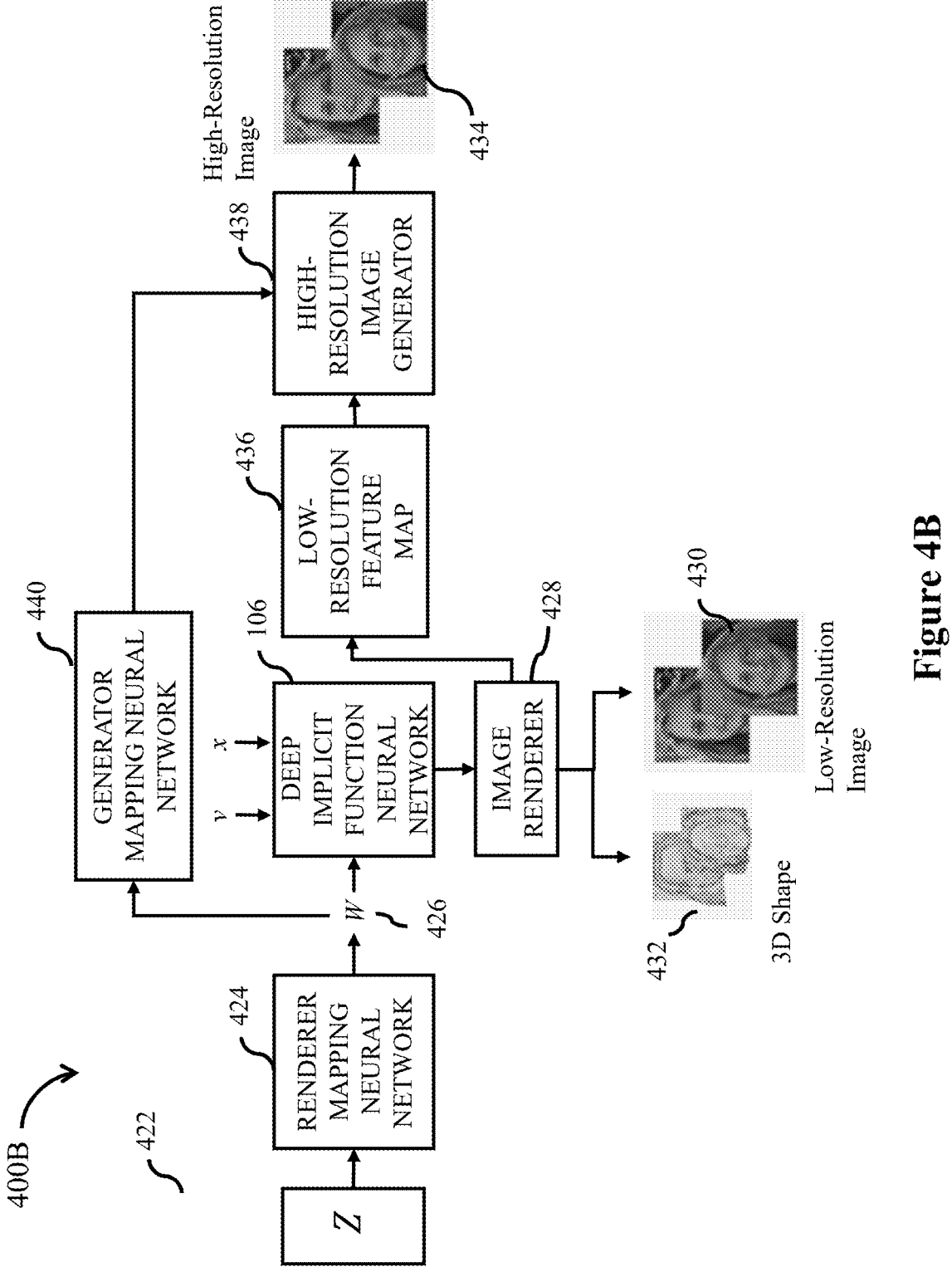
FIG. 4B illustrates an example block diagram of an implicit 3D GAN, according to one or more embodiments.

FIG. 4B illustrates an example architecture 400B of the implicit 3D GAN 420, in accordance with some embodiments of the present disclosure. The implicit 3D GAN 420 is configured to form an image generation model using, for example, a renderer mapping neural network 424, a deep implicit function neural network 106, an image renderer 428, a generator mapping neural network 440, and a high-resolution image generator 438.

In an example, an input for the implicit 3D GAN 420 is a latent code vector Z 422. For example, the implicit 3D GAN architecture is based on the StyleSDF architecture. In previous uses of implicit 3D GAN architectures, including StyleSDF, the latent code vector is an entangled representation of all of the attributes of a 3D object and its 2D image that will be generated.

In embodiments of the present invention, however, the latent code vector Z 422 is a disentangled set of latent parameters 104 and 414 that is separated into subsets of latent parameters, where each subset represents a different attribute or subset of attributes. In some embodiments, the latent code vector Z 422 may be drawn from a Gaussian distribution, such as the Gaussian distribution 304.

The renderer mapping neural network 424 transforms the disentangled latent code vector Z 422 into a joint representation W 426, which may be entangled but is in a form that is usable by the deep implicit function neural network 106. A differentiable image renderer 428 is used to render outputs from the 3D object that is implicitly represented by the deep implicit function neural network 106 based on the joint representation W 426. In some embodiments, the image renderer 428 outputs a low-resolution 2D image 430 of the object, and in some embodiments, it also outputs a corresponding 3D shape 432 of the object.

While the low-resolution image 430 of the object may be good, in some embodiments a high-resolution image 434 of the object is desired. To achieve this, the image renderer 428 also outputs a low-resolution feature map F 436, which is then fed as input to a high-resolution image generator 438.

Making use of the deep implicit function neural network 106, the image renderer 428 produces the low-resolution image 430 and the low-resolution feature map 436 via volumetric rendering. In some embodiments, this is accomplished as follows. Based on the values of the elements of the joint representation W 426, the deep implicit function network 106 takes in a 3D query point x and a viewing direction v and maps them into an SDF value d(x, W), a radiance c(x, v, W), and a feature vector f(x, v, W). The image renderer 428 uses these outputs of the deep implicit function neural network to generate a low-resolution image, (430 and a corresponding low-resolution feature map F 436 using volume rendering. In an example, each pixel in the low-resolution image, C, 430 and the low-resolution feature map F 436 is computed by querying points indexed by t along a ray r, using r(t)=o+tp, where o is the virtual camera position from which the ray originates, and p is a vector corresponding to the image pixel location at which the ray will be rendered. In this manner, each pixel in C 430 and the low-resolution feature map, F 436, are computed using the following formulas:

$$C(r) = \int_{t_f}^{t_n} T(t)\sigma(r(t))c(r(t),\, p)dt$$

$$F(r) = \int_{t_f}^{t_n} T(t)\sigma(r(t))f(r(t),\, p)dt$$

where $$T(t) = \exp\left(-\int_{t_f}^{t_n} \sigma(r(s))ds\right)$$

represents the visibility of each point along the ray, and $t_n$ and $t_f$, respectively represent the values of t corresponding to the nearest and farthest points along the ray that may be incorporated into the rendering view. Here, the density field $\sigma(x)$ is obtained from the SDF d(x) according to $$\sigma(x) = \frac{1}{\alpha} Sigmoid\left(\frac{-d(x)}{\alpha}\right),$$

where $\alpha$ is a learned parameter.

In an example, the high-resolution image generator 438 is implemented as a neural network with a style-based GAN architecture, such as the StyleGAN2 architecture. The low-resolution feature map F 436 is passed to the high-resolution image generator 438. The style-based image generator 438 is configured to map the feature map, F, 436 into a high-resolution image, I 434, conditioned on a style code g(W). The style code is produced by passing the joint representation W 426 into the generator mapping neural network, g 440. The role of the generator mapping neural network 440 is to convert the joint representation W 426 into a form that can be used as a style code that modulates the layers of the style-based GAN high-resolution image generator 438.

In an example, the high-resolution image generator 438 is configured to render the high-resolution 2D image 434 of the scene including the object. The 2D image 434 may be viewed from the input viewing direction, v. In certain cases, the image renderer 428 may also be configured to render the low-resolution 2D image 430 of the scene. One or both of these images 430, 434 may be rendered and stored for later use, for example in computer memory or in computer files on an analog or digital storage medium, and/or rendered on a display device. The display device may be, for example, a display screen of a computing device.

In order for the implicit 3D GAN 420 to take disentangled latent parameters as its input Z 422, the implicit 3D GAN 420 is trained using loss functions that encourages or enforces that the input representation Z 422 is disentangled according to the attributes of the object in the image. This disentangled training is described with reference to FIG. 6A and FIG. 6B.

Overview of Architecture of AI-Based Image Processing System

Figure 5:
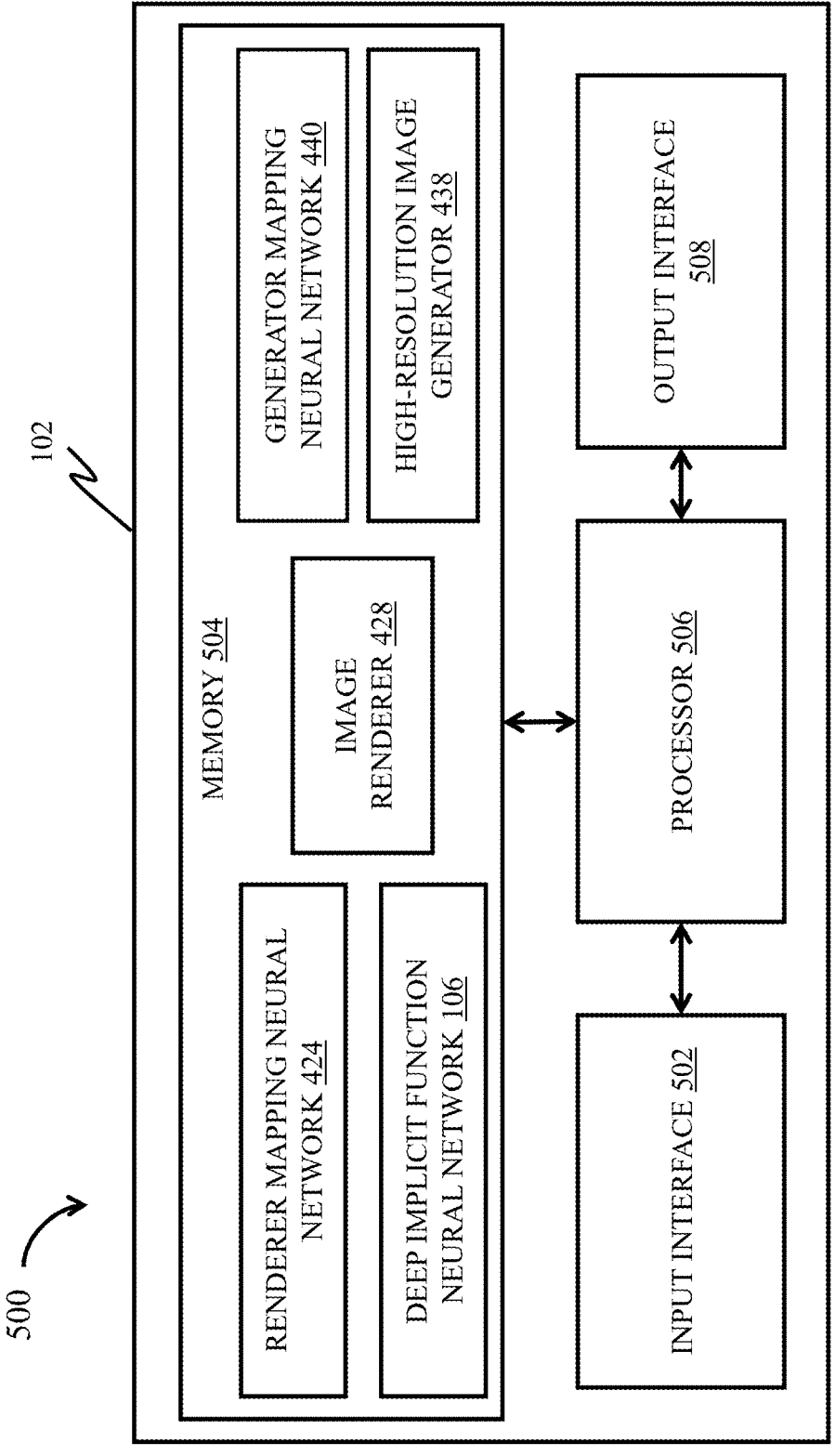
FIG. 5 illustrates an example block diagram of the image processing system, according to one or more embodiments.

FIG. 5 illustrates an example block diagram 500 of the image processing system 102, according to some embodiments. The system 102 includes an input interface 502, a memory 504, a processor 506 and an output interface 508. The input interface 502 is configured to receive the set of latent parameters 104. The set of latent parameters 104 may define representations of values of attributes of a 3D object in an image in a latent space. In an example, the set of latent parameters 104 may include, but are not limited to, $Z_\alpha$, $Z_\gamma$, $Z_\tau$, $Z_h$, $Z_r$, and $Z_\theta$. Subsequently, the attributes corresponding to the set of latent parameters 104 include, but are not limited to, shape, $\alpha$; albedo, $\tau$; illumination or lighting, $\gamma$, background, h, pose, $\theta$, and rest or remaining attributes, r. For example, the values of attributes may be generated by the object encoder 402, or a different encoder or set of encoders.

For example, the set of latent parameters 104 may also include a latent parameter subset corresponding to hair. For example, $Z_h$ may correspond to hair and/or background, when the 3D object is a human head. Moreover, an additional latent parameter subset, represented by $Z_r$, may be introduced as part of the set of latent parameters 104. The additional latent parameter subset $Z_r$ is introduced to enable the system to represent appearance variations of the scene that are not covered by the other latent parameters. In particular, the variable latent parameter $Z_r$ may be used by a model, for example, the deep implicit function neural network 106, to assign any appearance factor(s) that may have not been explained by other latent parameters in the received set of latent parameters 104. For example, such additional latent parameter may correspond to one or more attributes that are not identified or encoded by the object encoder. For instance, if $Z_h$ corresponds to hair, then $Z_r$ may encode, in whole or in part, a representation of the background of the scene in an image. Other attributes that may be represented by $Z_r$ include fine appearance details, specular lighting effects, and object shape or appearance details that were not encoded by the encoder 402.

In an example, the set of latent parameters 104 includes multiple subsets of latent parameters. It may be understood, embodiments of the present disclosure aim to use a disentangled latent code (interchangeably referred to as latent code vector) for a 3D implicit model that is configured to generate a 3D model of the 3D object. In this regard, a multi-dimensional latent code of the scene is partitioned into the set of latent parameters 104 defining representations of multiple attributes of the 3D object in the image. The set of latent parameters is such that the set includes multiple subsets of latent parameters. For example, the multiple subsets of latent parameters refer to individual latent parameters $Z_\alpha$, $Z_\gamma$, $Z_\tau$, and $Z_h$ that are associated with corresponding attributes $\alpha$, $\gamma$, $\tau$, and h. to this end, each latent parameter subset, say $Z_\alpha$, corresponds to an attribute, say $\alpha$, from the multiple attributes of the 3D object.

The memory 504 is configured to store a renderer mapping neural network 424, the deep implicit function neural network 106, an image renderer 428, a generator mapping neural network 440, and a high-resolution image generator 438.

In operation, the renderer mapping neural network 424 is trained to produce a joint encoding of the set of latent parameters 104. For example, the joint encoding may represent the values of the set of latent parameters 104 in an intermediate latent space for processing.

Further, the deep implicit function neural network 106 is trained to produce an implicit 3D model of the 3D object in an image. For example, the implicit 3D model may define a volumetric representation for each 3D location in a scene of the image including the 3D object with respect to an input viewing direction, such as the input viewing direction 108. In an example, the volumetric representation is based on a signed distance field (SDF), neural radiance field (NeRF), or Gaussian splatting. For example, the volumetric representation defines a signed distance value and/or an optical density, and a color and/or a feature vector for each 3D location in the scene and viewing direction. In an example, the deep implicit function neural network 106 may utilize a signed distance function (SDF) for generating the volumetric representation. In this regard, the deep implicit function neural network 106 may take as input a 3D query point, x, and an input viewing direction v. Further conditioned on the set of latent parameters, z, the deep implicit function neural network 106 outputs an SDF value d(x, z), a view-dependent color value c(x, Y, z), and feature vector f(x, Y, z). The SDF value indicates the distance of the queried point from the surface boundary, and the sign indicates whether the point is inside or outside of the surface. In another example, the deep implicit function neural network 106 may utilize NeRF for using a volumetric representation for reconstructing a 3D scene as a combination of neural radiance and density fields.

In an example, the volumetric representation is generated using SDF such that the volumetric representation defines a signed distance value or a color. In another example, the volumetric representation is generated using NeRF such that the volumetric representation defines an optical density or a feature vector Subsequently, the implicit 3D model produced by the deep implicit function neural network 106 is used by the image renderer 428 to generate a new image or generate a modified image 110.

For example, the deep implicit function neural network 106 is trained to incorporate a set of parametric consistency loss functions to enforce consistency between the values 414 of the set of latent parameters that are used to generate the implicit 3D model of the 3D object and values or numerical values of attributes of the 3D object extracted by the object encoder 204 or 402 from an image. In addition, for generating images for human head-based 3D object, the deep implicit function neural network 106 is also trained to incorporate a set of image-based consistency loss functions. The image-based consistency loss functions are incorporated to minimize an impact caused due to changes in latent parameter of hair of the human head, $Z_h$ on the face appearance of the human head. For example, the latent parameters for face appearance may include, $Z_\alpha$, $Z_\gamma$, $Z_\tau$, and $Z_\theta$. Alternately, the image-based consistency losses are incorporated to also minimize the effect of changes in face-specific latent parameters on the hair and background appearance.

Further, each of the independent disentangled latent parameters are combined to produce the 2D output image 110. In some embodiments, the output image 110 is produced using an image renderer 428. In other embodiments, the output image 110 is produced using a high-resolution image generator 438.

The processor 506 is configured to submit data, such as the values 414 of the set of latent parameters 104, the input viewing direction 108, and in some cases, an input image received from the input interface 502 to the deep implicit function neural network 106 for image generation and/or image editing or manipulation. The processor 506 is configured to manipulate the disentangled latent parameters of the physical attributes using multiple subnetworks to modify attributes of the 3D model of the 3D object so that 2D output image can be reconstructed. The 2D output image is output via the output interface 508.

Overview of Training the AI-Based Image Processing System

Figure 6A:
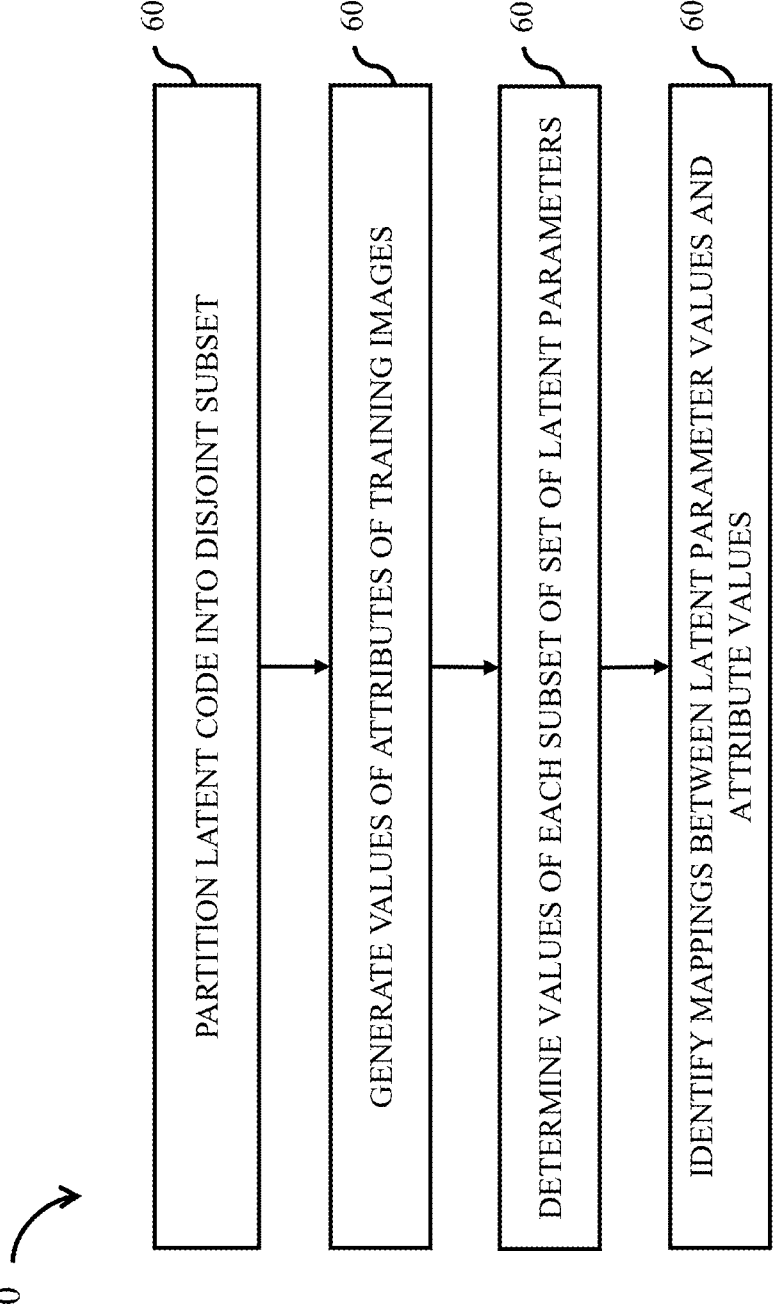
FIG. 6A illustrates an example flowchart of a method for identifying a set of latent parameters, according to one or more embodiments.

FIG. 6A illustrates an example flowchart 600 of a method for identifying the set of latent parameters 104, according to some embodiments. In one example, the image processing system 102 is configured to generate or identify the set of latent parameters 104, specifically, a mapping or mapping relationship 202 between the set of latent parameters and corresponding values of attributes during a training phase. In such a case, values of attributes of training images 112 are utilized to generate the values of each subset of the set of latent parameters 104.

At 602, a 256-dimensional latent code Z is partitioned into disjoint subsets of the set of latent parameters 104, separately. In an example, 128 dimensions are allocated to latent parameters, such as $Z_\alpha$, $Z_\gamma$, $Z_\tau$, and $Z_\theta$, corresponding to the attributes of the 3D object in a scene.

Further, 64 dimensions are allocated to latent parameter, $Z_h$, corresponding to hair and background appearance, and 64 dimensions are allocated to latent parameter, $Z_r$, to account for any remaining details in and around the 3D object or a face of a human head.

In an example, to determine the dimensionality to allot to each of the attributes, an eigen-decomposition is performed over the corresponding data covariance matrices $\Sigma_\alpha$, $\Sigma_\tau$, and $\Sigma_\gamma$ respectively, that are obtained by encoding images 112 in the training dataset from the object encoder 402 using the pretrained encoders corresponding to shape $\alpha$, albedo $\tau$, and illumination $\gamma$ attributes. Based on the eigen-decomposition, a dimensionality of, for example, $d_\alpha=37$ for $Z_\alpha$ and $d_\tau=64$ for $Z_\tau$, which accounts for well over 95% of the variance in their respective distributions are allotted. Moreover, in order to enable full explicit control over the 27 spherical harmonics lighting attributes, a dimensionality of, for example, $d_\gamma=27$ is allocated to $Z_\gamma$.

At 604, values of the attributes of the training images 112 are generated by the object encoder 402. Details of the operations of the object encoder are described in FIG. 4.

At 606, based on the values of each of the attributes $\alpha$, $\tau$, $\gamma$, $\theta$, h, r (referred to as attribute values) and the dimensionality allocated to the corresponding subset, such as $Z_\alpha$, $Z_\gamma$, $Z_\tau$, and $Z_\theta$ from the set of latent parameters 104, the values of each subset of the set of latent parameters 104 (referred to as latent parameter values) are determined. In an example, the values of the $Z_\alpha$, $Z_\gamma$, $Z_\tau$, and $Z_\theta$ are determined by performing a PCA analysis on the values of each of the attributes $\alpha$, $\tau$, $\gamma$, $\theta$.

In an example, eigenvectors as well as coefficients of eigen vectors for each matrix Z corresponding to the attributes are used to calculate the new values for the subset of the set of latent parameters 104. To this end, each subset of the latent parameters, i.e., $Z_\alpha$, $Z_\gamma$, $Z_\tau$, $Z_h$ and $Z_r$ is calculated separately from the other subsets in the set of latent parameters 104.

Thereafter, at 608, the mappings between the latent parameter values and the attribute values are identified. In other words, the system 102 is configured to utilize values of an attribute, say $\alpha$, at different 3D locations of a 3D object in the training images 112 to generate a Z matrix for the attributes, i.e., $Z_\alpha$. Based on the values of $\alpha$ and $Z_\alpha$, mapping between them is determined. For example, the Z matrix is generated using an approach for dimensionality reduction or representation of high-dimensional values of the attributes as low-dimensional value of latent parameters in a latent space, such as using PCA.

Further to achieve $Z_\omega\sim N(0, I)$ for $\omega\in(\alpha, \tau, \gamma)$, eigen-decomposition is used to create a mapping between the value of attribute encoding from an image and the corresponding latent code. The mapping, $\omega$, for an attribute is defined by Equation (1).

To this end, the mapping is identified or extracted for values of attributes and values of latent parameters for each image from the training images 122. Thereafter, the mapping relationships between attributes and corresponding parameters are identified and stored as the mapping relationship 202 and 112.

Figure 6B:
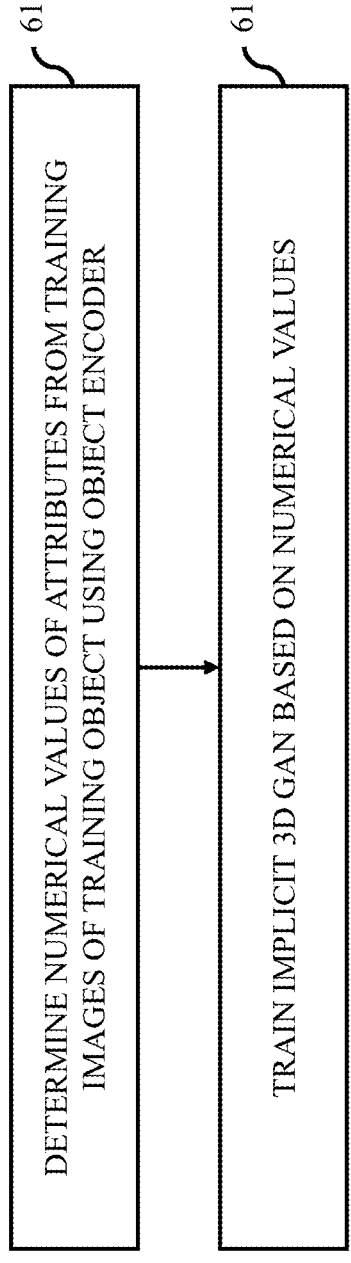
FIG. 6B illustrates a training process for training a deep implicit function neural network, according to one or more embodiments.

Further details of the training of the AI-based image processing system 102 are described in conjunction with FIG. 6B. to this end, the FIG. 6B illustrates a training process for training the implicit 3D GAN 420 with disentangled latent vectors, according to some embodiments. In an example, the implicit 3D GAN architecture 420 includes a renderer mapping neural network 424, a deep implicit function neural network 106, an image renderer 428, a generator mapping neural network 440, and a high-resolution image generator network 438 that is implemented as a style-based GAN. The entire system may be called a Controllable Latent StyleSDF (CoLa-SDF).

At 610, numerical values of attributes of training images 112 for training are determined. For example, the numerical values of the attributes, such as $\alpha$, $\tau$, $\gamma$, $\theta$, h are determined for each image by processing each image of the set of training images 112 with the object encoder 402 to generate encodings. In certain cases, values of encodings are represented in a latent space as values of the set of latent parameters.

Further, at 612, the implicit 3D GAN 420 is trained based on the numerical values of the attributes from training images of training objects. In particular, the numerical values of the attributes or the encoding of the values in the latent space, i.e., the values of the set of latent parameters 104 of training images 112 are used for training the deep implicit function neural network 106, the renderer mapping neural network 424, the generator mapping neural network 440, and the high-resolution image generator 438. Further, based on the training object in the training images 112, the deep implicit function neural network 106 is trained to generate a 3D volumetric representation of the training object based on the values of the set of latent parameters 104 of the training images 112.

In one example, the training of the implicit 3D GAN 420 is performed by enforcing a correspondence between the latent codes for the attributes, such as shape, $\alpha$, albedo, $\tau$, and illumination, $\gamma$, of the training images 112 and the parameters of a 3DMM model that has built-in disentangled latent codes. Moreover, pose control is enforced using 3D volume renderings and view-dependence property of implicit 3D GANs. Further, in order to encourage part of the latent codes or parameters of the training images 112 to correspond to hair and background, an image-based photo-consistency loss on hair and background regions of the images encourages different faces generated using the same hair and background codes to have consistent hair and background appearance.

In this manner, the implicit 3D GAN 420 is trained using the object encoder 402, particularly, encodings of values of attributes of the training images. For example, the object encoder 402 determines numerical values of attributes from the training images 112. Based on the numerical values of attributes from the training images 112 as well as their representation in the latent space as the set of latent parameters 104, a mapping relationship between the attributes and the set of latent parameters is determined. For example, the mapping is indicative of a manner of transformation of the attribute values into corresponding latent parameter values. Further, the identified mapping is used for generating images during inference phase.

In an example, the image generation model is implemented using an implicit 3D GAN model 420 based on the StyleSDF architecture because of its high rendering quality, and because it explicitly models values of 3D shape attribute of the training images 112 in the form of a signed distance field (SDF). In this manner, embodiments of the present disclosure enable modifications and enhancements to StyleSDF to enable disentangled control of physical attributes by modifying disjoint segments of its latent code.

Some embodiments are based on an understanding that disentangling the latent space of an implicit 3D GAN model according to a 3DMM requires the 3DMM encoder to be differentiable and highly expressive. Therefore, an encoder of a non-linear 3DMM model, such as MOST-GAN, is used in the object encoder 402 for generating the attribute encodings or the values of the set of latent parameters 104.

The training of the implicit 3D GAN, including its various subnetworks that make up the AI-based image processing system 102, is performed based on loss functions that enforce the consistency in rendered images during training phase and input data. This is described in detail in conjunction with FIG. 7.

Figure 7:
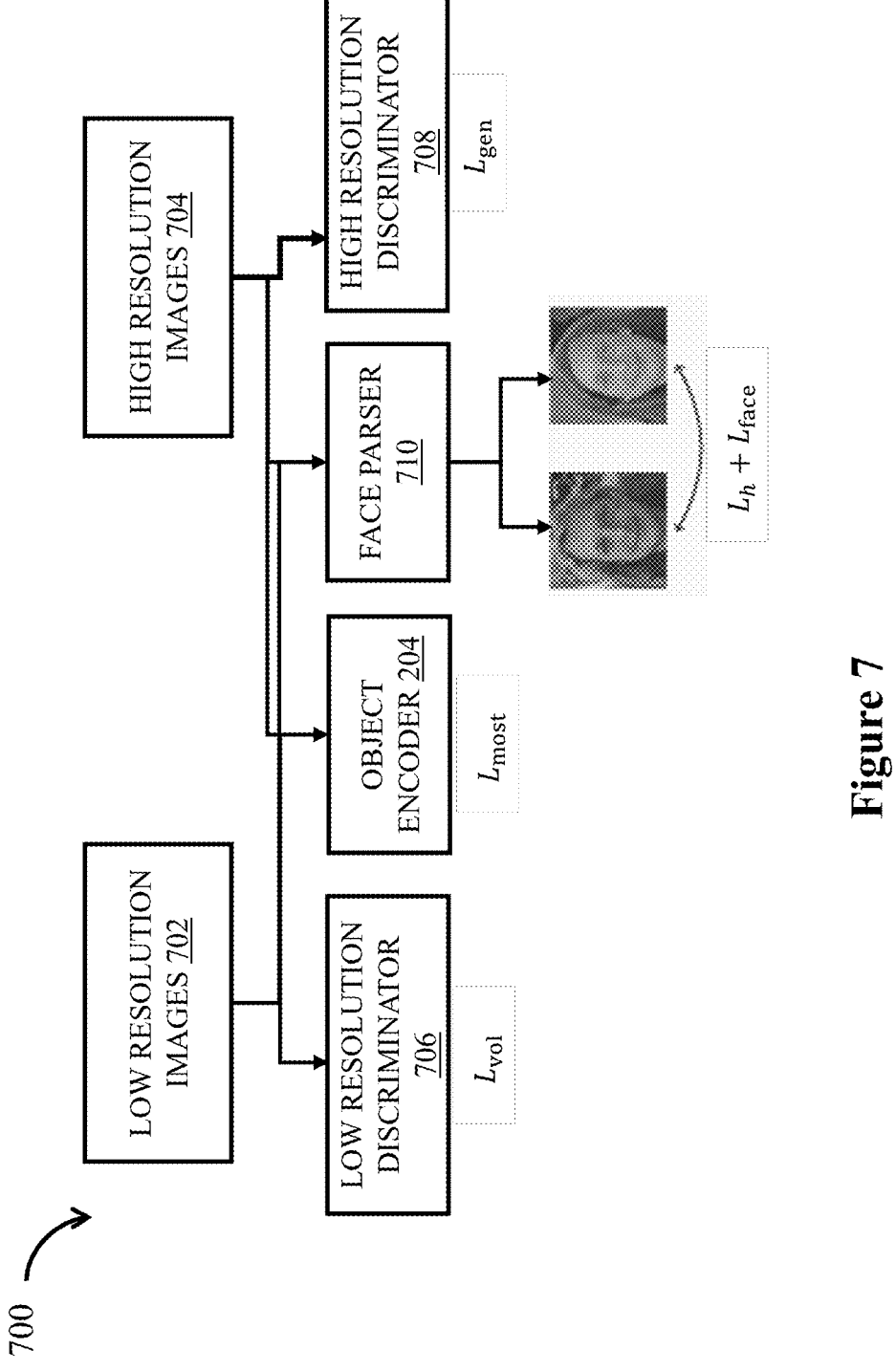
FIG. 7 illustrates an example flowchart of a training method for the AI-image processing system, according to one or more embodiments.

FIG. 7 illustrates an example flowchart 700 of a training method for the AI-image processing system 102. During a training phase, training images 112 comprising low resolution images 702 and high-resolution images 704 are used. In an example, the low-resolution images 702 may have considerably fewer pixels than the high-resolution images. For example, the low-resolution images could have dimensions 64×64 pixels, and the high-resolution images could have dimensions 256×256 pixels. In an example, the training images 112 may include low-resolution images 702 and high-resolution images 704. In another example, low-resolution images 702 may be generated from high-resolution images 704, for example via down-sampling.

In an example, the AI-image processing system 102 includes a deep implicit function neural network 106, a renderer mapping neural network 424, a high-resolution image generator 438, and a generator mapping neural network 440. For example, the deep implicit function neural network 104 is to be trained to generate a 3D volumetric representation of 3D object based on the joint encoding. The image renderer 428 (which in preferred embodiments does not require training) can use the trained deep implicit function neural network 106 to render a low-resolution 2D image of a 3D object and corresponding low-resolution feature map 436. Further, the high-resolution image generator 438 is trained to render a corresponding high-resolution 2D image of the 3D object. To this end, the AI-image processing system 102 is trained in in two stages.

In the first stage of training, the deep implicit function neural network 106 and the renderer mapping neural network 424 are trained, while the generator mapping neural network 440 and the high-resolution image generator 438 remain untrained and unused. At the end of the first stage of training, the weights of the deep implicit function neural network 106 and the renderer mapping neural network 424 are frozen.

In the second stage of training, the high-resolution image generator 438 and the generator mapping neural network 440 are trained. For example, the deep implicit function neural network 106 and image renderer 428 comprise an SDF volume renderer, and the high-resolution image generator is a 2D style-based generative adversarial network (GAN). Further, in addition to StyleSDF-based losses, consistency losses are introduced at each stage for enforcing relationship between attributes and its latent parameter in the neural networks.

In the first stage of training, the deep implicit function neural network 106 and the renderer mapping neural network 424 are trained. In this case, the low-resolution images 702 may be used for training. For example, the low-resolution discriminator 706 may try to distinguish real data from the data created by the generator. In other words, the low-resolution discriminator 706 tries to distinguish real photographic low-resolution images that belong to the training set from 2D low resolution images 430 of synthetic 3D objects generated by the deep implicit function neural network 106 using randomly sampled values of the set of latent parameters 104 and rendered by the image renderer 428. In certain cases, the low-resolution discriminator 706 may also take in high-resolution images 704, convert them to low resolution and then try to distinguish between these low-resolution real images and low-resolution images 430 of synthetic 3D objects generated by the deep implicit function neural network 106 using randomly sampled values of the set of latent parameters 104 and rendered by the image renderer 428.

Based on the distinguishing by the low-resolution discriminator 706, a loss of $\mathcal{L}_{vol}$ is introduced. In an example, the loss, $\mathcal{L}_{vol}$, may include a non-saturating GAN loss with R1 regularization, $\mathcal{L}_{adv}$, a pose alignment loss, $\mathcal{L}_{view}$, an eikonal loss, $\mathcal{L}_{eik}$, and a minimal surface loss, $\mathcal{L}_{surf}$.

In an example, the pose alignment loss, $\mathcal{L}_{view}$, is designed to make sure that all the generated objects are globally aligned. On top of predicting whether the image is real or fake, the discriminator also tries to predict the two input camera angles $(\varphi, \theta)$. The pose alignment loss, $\mathcal{L}_{view}$, is a smoothed L1 loss between a pose $(\varphi, \theta)$ used by the volume renderer to generate images, and a pose $(\hat{\varphi}, \hat{\theta})$ predicted by the low-resolution discriminator. The loss $\mathcal{L}_{view}$ has two practically identical terms, one for $\theta$ and one for $\varphi$; for brevity, we only show the term for $\theta$ here:

$$\mathcal{L}_{view} = \begin{cases} (\hat{\theta} - \theta)^2 & \text{if } |\hat{\theta} - \theta| \le 1 \\ |\hat{\theta} - \theta| & \text{otherwise} \end{cases}$$

In an example, the eikonal loss, $\mathcal{L}_{eik}$, enforces a physical validity of the signed distance field:

$$\mathcal{L}_{eik} = \mathbb{E}_x(\|\nabla d(x)\|_2 - 1)^2.$$

In an example, the minimal surface loss, $\mathcal{L}_{surf}$, penalizes the SDF values that are close to zero to avoid spurious zero-crossings and non-visible surfaces from being formed:

$$\mathcal{L}_{surf} = \mathbb{E}_x(\exp(-100|d(x)|)).$$

In the second stage of training, the high-resolution image generator 438 and the generator mapping neural network 440 are trained. In this case, a high-resolution discriminator 708 tries to distinguish real high-resolution images that belong to the training set from high-resolution images 434 of synthetic 3D objects that were generated by passing randomly sampled values of the set of latent parameters 104 through the implicit 3D GAN pipeline 400B.

Based on the distinguishing by the high-resolution discriminator 708, a loss of $\mathcal{L}_{gen}$ is introduced. In an example, the loss, $\mathcal{L}_{gen}$, comprises a path regularization loss, $\mathcal{L}_{path}$ and a non-saturating GAN loss with R1 regularization, $\mathcal{L}_{adv}$. For example, the first-stage training loss $\mathcal{L}_{vol}$ and second-stage training loss $\mathcal{L}_{gen}$ can be defined as:

$$\mathcal{L}_{vol} = \mathcal{L}_{adv} + \lambda_{view}\mathcal{L}_{view} + \lambda_{eik}\mathcal{L}_{eik} + \lambda_{surf}\mathcal{L}_{surf} \tag{2}$$

$$\mathcal{L}_{gen} = \mathcal{L}_{adv} + \lambda_{path}\mathcal{L}_{path} \tag{3}$$

Where $\lambda_{view}$, $\lambda_{eik}$, $\lambda_{surf}$ and $\lambda_{path}$ are constant weights that may be set empirically to provide a useful balance between the individual losses. In an example, $\lambda_{view}=15$, $\lambda_{eik}=1$, $\lambda_{surf}=1$, and $\lambda_{path}=2$.

Some embodiments are based on an understanding that, to disentangle attributes, such as shape, albedo and illumination, parametric consistency between sampled values for the set of latent parameters 104 and encodings of the values of the attributes, such as $\alpha$, $\tau$, $\gamma$, and $\theta$, needs to be enforced. Further, to disentangle hair/background, re-sampling of the values of face parameters $Z_\alpha$, $Z_\tau$, and $Z_\gamma$ needs to be performed and image-based consistency is to be enforced on the hair and background, followed by re-sampling of the values of $Z_h$ and enforcing image-based consistency on the face regions.

In addition to the StyleSDF losses, $\mathcal{L}_{vol}$ in the first stage of training and $\mathcal{L}_{gen}$ in the second stage of training, some embodiments include encoder-based parametric consistency losses and image-based hair/background consistency losses in both the first stage and the second stage of training. These consistency losses promote disentanglement of the object or face attributes in the model. In the first stage of training, the consistency losses are applied to the low-resolution images. In the second stage of training, the consistency losses are applied to the high-resolution images. The use of the consistency loss functions, in conjunction with the previously described losses $\mathcal{L}_{vol}$ and $\mathcal{L}_{gen}$, is explained in conjunction with FIG. 8.

Figure 8:
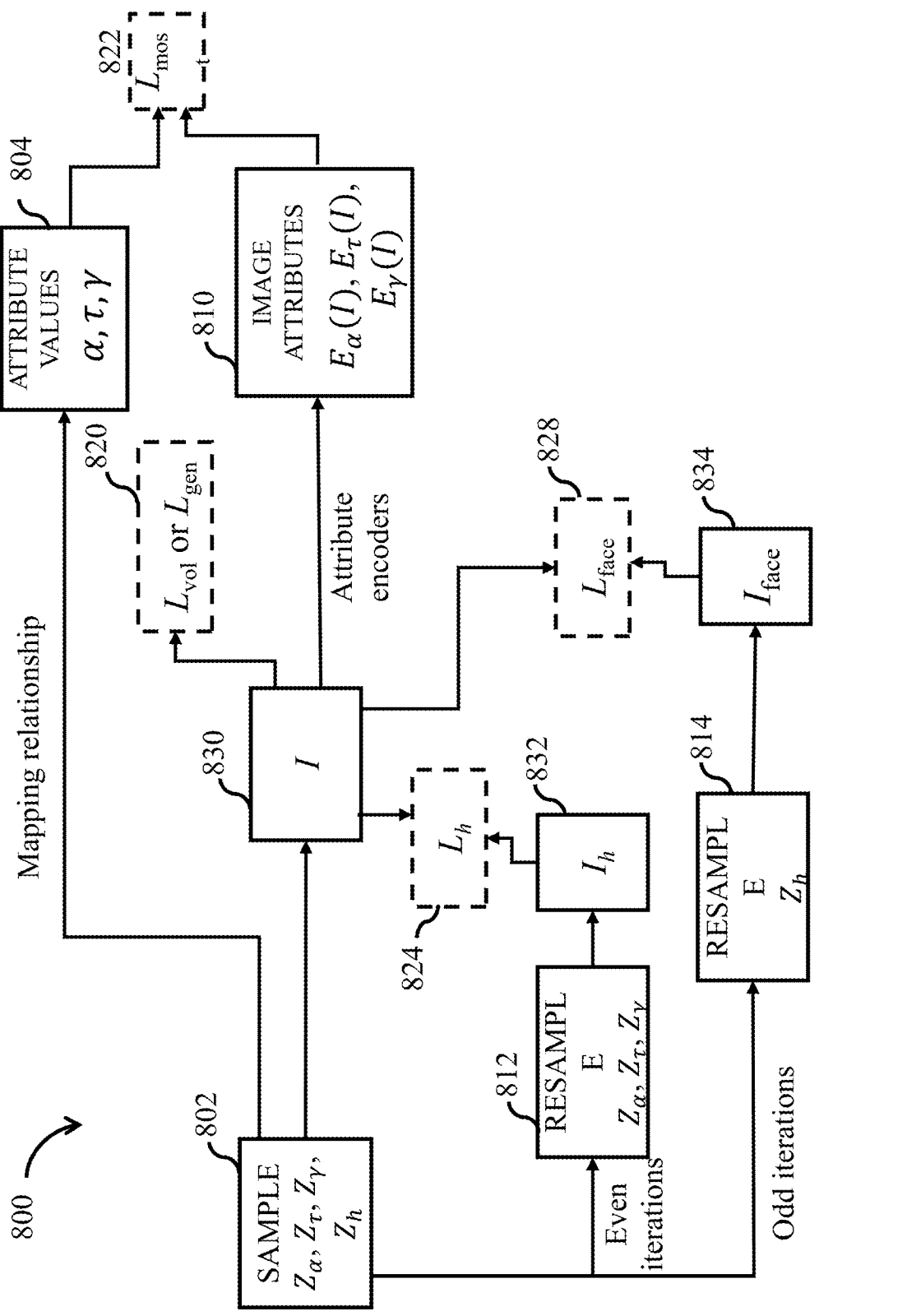
FIG. 8 illustrates an example flowchart of a method for training the system based on consistency loss functions, according to one or more embodiments.

FIG. 8 illustrates an example flowchart 800 of one iteration of training of the system 102 using consistency loss functions, according to some embodiments. This training flowchart applies to both stage 1 and stage 2 of training.

In each iteration of training, a set of values of the latent parameters 104 are sampled 802, e.g. randomly. These values are run through an implicit 3D GAN 400B to generate an image I 830 of a 3D object. Which image is represented in the figure by I 830 depends on which stage of training the system is undergoing. In the first stage of training, the image I 830 represents the low-resolution image 430 output by the image renderer 428, and the previously described loss 820 that is used for that image is $\mathcal{L}_{vol}$. In the second stage of training, though, the image I 830 represents the high-resolution image 434 output by the high-resolution image generator 438, and the previously described loss 820 that is used for that image is $\mathcal{L}_{gen}$.

Using a mapping relationship as determined in 608 between the sampled set of latent parameters 104 and the corresponding attribute values 804, for example Equation (1), attribute values 804 that correspond to the latent parameter values 104 may be determined. To encourage the generated image, I, 830 to exhibit corresponding visual attributes, the attribute encoders 406 from the object encoder 402 are applied to the generated image I 830 to determine the attribute values 408 that are exhibited in the image, i.e., the image attributes 810. For example, the values 810 encoded from image I 830 of the attributes shape $\alpha$, albedo $\tau$, and illumination, $\gamma$, may be written respectively as $E_\alpha(I)$, $E_\tau(I)$, and $E_\gamma(I)$.

The parametric consistency loss function, $\mathcal{L}_{most}$ 822, is used to encourage consistency of a generated image I 830 during training, as described by its encoded image attributes 810, to the values of the set of latent parameters 104 that were sampled 802 in order to generate that image. The parametric consistency loss, $\mathcal{L}_{most}$ 822, is defined as:

$$\mathcal{L}_{most} = \lambda_\alpha\mathcal{L}_\alpha + \lambda_\tau\mathcal{L}_\tau + \lambda_\gamma\mathcal{L}_\gamma + \lambda_\theta\mathcal{L}_\theta \tag{4}$$

where the shape consistency loss function, $\mathcal{L}_\alpha$, is defined as:

$$\mathcal{L}_\alpha = \|E_\alpha(I) - \alpha\|_2^2.$$

For example, $\mathcal{L}_\alpha$ enforces that the shape encoding $E_\alpha(I)$ of the generated image I 830 produced by the object encoder 402 is the same as the sampled shape attribute values 804 $\alpha$ obtained from Equation (1).

The albedo consistency loss function, $\mathcal{L}_\tau$, and illumination consistency loss function, $\mathcal{L}_\gamma$, are defined similarly.

In addition, the consistency loss $\mathcal{L}_{most}$ 822 includes a pose-consistency loss function $\mathcal{L}_\theta$ to enforce that modifying the values of non-pose latent parameters such as $Z_\alpha$, $Z_\tau$, $Z_\gamma$, and $Z_h$ should not change the pose of the generated object. This is enforced by comparing the pose encodings of I with the pose encoding of an image that is generated in a resampling phase of the iteration, as explained below. In each iteration, the pose-consistency loss function $\mathcal{L}_\theta$ is given by either:

$$\mathcal{L}_\theta = \|E_\theta(I) - E_\theta(I_h)\|_2^2$$

or $$\mathcal{L}_\theta = \|E_\theta(I) - E_\theta(I_{face})\|_2^2,$$

depending on whether the resampling phase of the iteration produced the generated image $I_h$ 832 or $I_{face}$ 834.

In Equation (4), $\lambda_\alpha$, $\lambda_\tau$, $\lambda_\gamma$, and $\lambda_\theta$ are constant weights that may be selected empirically to produce good results, for example, $\lambda_\alpha=3000$, $\lambda_\tau=100$, $\lambda_\gamma=60$, and $\lambda_\theta=1000$.

It may be noted that when the 3D object is a human head, then an image of the human head may include both a face region and a hair region. However, existing 3DMM-based approaches do not model hair and background. One nonlinear 3DMM method, MOST-GAN, does include a hair encoder. However, the MOST-GAN hair encoder is not fully three-dimensional (3D), which may make it less than ideal for defining a hair attribute of a 3D system. However, it is not necessary to have an attribute encoder in order to learn a disentangled latent code to control a specific attribute. In some embodiments, the disentanglement of one or more attributes may be accomplished using semantic segmentation of images. In some embodiments, this is how hair and background latent parameters are disentangled from other latent parameters.

Pursuant to embodiments of the present disclosure, to disentangle hair/background from other physical attributes, a hair/background latent parameter subset $Z_h$ is applied only to model the hair and background. In other embodiments, the hair and background attributes could be separated into two parameter subsets, one for hair and one for background. In embodiments in which the object is not a human head, similarly trained subsets of latent parameters could be learned just for background, or for attributes of the object for which an encoder is not available.

To this end, some embodiments utilize a semantic segmentation algorithm that may be used to partition images into semantically meaningful regions. For example, a face parser refers to a semantic segmentation algorithm that can segment images containing faces into semantically meaningful regions, including a face region, a hair region, and a background region. The output of such a face parser may include a binary mask $M_{face}$, indicating the pixels of an image that are in a face region, $M_{hair}$, indicating the pixels of an image that are in a hair region, and $M_{background}$, indicating the pixels of an image that are in background regions (i.e., regions that contains neither face nor hair). Further, these binary masks may be combined to indicate combined regions. For example, a mask $M_{hairbg}=M_{hair}\cup M_{background}$ indicates the pixels of an image that belong to either the hair or the background. For example, the notation $M_{hairbg}(I)$ is a binary mask indicating the pixels of the image I that belong to either hair or background. In other embodiments, M could be a real-valued mask rather than a binary mask.

In each iteration, the initial sampling of latent parameters 802 and generation of the corresponding image I 830 may be followed a resampling phase of the iteration in which some latent parameters are resampled and an image-based consistency loss encourages the non-resampled attributes to remain the same in an image generated by these resampled parameter values. Which latent parameters are resampled in each iteration can be alternated. In some embodiments, in even-numbered iterations, $Z_\alpha$, $Z_\tau$, and $Z_\gamma$ are resampled 812, while in odd-numbered iterations, $Z_h$ is resampled 814.

In an example, the image-based consistency loss functions $L_h$ and $L_{face}$ are used when the 3D object is a human head and attributes for face need to be disentangled from attribute(s) for hair/background. In this regard, the implicit 3D GAN 400B is trained based on two sets of image-based consistency loss functions: a face consistency loss, $L_{face}$ 828, to minimize a correlation between an appearance of a face and a latent parameter $Z_h$, which relates to the background and hair of the human head; and a hair and background consistency loss, $L_h$ 824, to minimize a correlation between an appearance of the background and hair of a human head and latent parameters $Z_\alpha$, $Z_\tau$, and $Z_\gamma$ that relate to an appearance of a face.

In another example, a similar set of image-based consistency loss functions are used when a 3D object in a scene may have a background that is not encoded by the encoder 402. In that case, $L_h$ is used as a background consistency loss, and $L_{face}$ is used as an object consistency loss.

In even iterations, $Z_\alpha$, $Z_\tau$, and $Z_\gamma$ are resampled 812, and then the latent code containing the new values of $Z_\alpha$, $Z_\tau$, and $Z_\gamma$ is used to generate a new image, $I_h$, 832. Because it is desired for the latent codes that were resampled to control face attributes but be unrelated to hair and background, we use the regenerated image, $I_h$, 832 to enforce hair/background consistency, using a hair/background consistency loss function, $\mathcal{L}_h$ 824.

In the resampling phase of odd iterations, the values of the face-related latent parameters, e.g., $Z_\alpha$, $Z_\tau$, and $Z_\gamma$, are held constant, and only the hair/background latent parameters $Z_h$ are resampled 814. Then, the latent code containing the new value of $Z_h$ is used to generate a new image, $I_{face}$, 834. Because it is desired for $Z_h$ to have no effect on the face region, we use the regenerated image, $I_{face}$, 834 to enforce face consistency, using a face consistency loss function, $\mathcal{L}_{face}$ 828.

In an example, the image-based consistency losses, i.e., the hair/background consistency loss function, $\mathcal{L}_h$, and face consistency loss function, $\mathcal{L}_{face}$, are defined as:

$$\mathcal{L}_h = \mathcal{L}_{photo}(I, I_h, M_h) + \mathcal{L}_{vgg}(I, I_h, M_h) \tag{5}$$

$$\mathcal{L}_{face} = \mathcal{L}_{photo}(I, I_{face}, M_f) + \mathcal{L}_{vgg}(I, I_{face}, M_f) \tag{6}$$

where a $M_h = M_{hairbg,I}(I) \cup M_{hairbg}(I_h)$ is the union of hair/background masks from the two generated images I 830 and $I_h$ 832, and $M_f = M_{face}(I) \cup M_{face}(I_{face})$ is the union of face masks from the two generated images I 830 and $I_{face}$ 834. In this regard, a pre-trained face parser 710 is used to parse the rendered face images into one segmentation mask for the face and one for hair and background. Further, the masked photometric loss function, $\mathcal{L}_{photo}$, is defined as:

$$\mathcal{L}_{photo}(x_1, x_2, m) = \|(x_1 - x_2) \odot m\|_1$$

where $x_1$, $x_2$ are two images, m is a binary mask, and $\odot$ is an element-wise product operator. Similarly, masked perceptual loss, $\mathcal{L}_{vgg}$, is defined as:

$$\mathcal{L}_{vgg}(x_1, x_2, m) = \|\varphi(x_1 \odot m) - \varphi(x_2 \odot m)\|_2^2$$

where $x_1$, $x_2$ are two images, m is a binary mask, $\odot$ is an element-wise product operator, and the function $\varphi()$ represents a feature map extracted from one or more hidden layers of an image processing neural network, for example a VGG network.

To this end, an overall loss for the first stage of training is given by a weighted combination of the losses 820, 822, 824, and 828:

$$\mathcal{L}_{vol}^{cola} = \mathcal{L}_{vol} + \mathcal{L}_{most} + \lambda_h \mathcal{L}_h + \lambda_{face} \mathcal{L}_{face} \tag{7}$$

In a similar manner, losses and loss functions are calculated for the second stage of training. The overall loss for the second stage of training is given by:

$$\mathcal{L}_{gen}^{cola} = \mathcal{L}_{gen} + \mathcal{L}_{most} + \lambda_h \mathcal{L}_h + \lambda_{face} \mathcal{L}_{face} \tag{8}$$

Where $\lambda_h$ and $\lambda_{face}$ are weights that indicate the relative weights of the loss functions and can also be used to indicate in which iterations each loss is used. For example, $\lambda_h=5$ in even iterations but=0 in odd iterations, and $\lambda_{face}=5$ in odd iterations but=0 in even iterations, for both the equations (7) and (8).

In an example, to obtain meaningful encodings from the object encoder 402 and meaningful face parsing from the face parser 710, the generated images from the AI-based image processing system 102 needs to look like 3D objects, such as faces. Hence, each stage is initialized by training with only StyleSDF losses $\mathcal{L}_{vol}$ and $\mathcal{L}_{gen}$ up to, for example, 3000 to 7000 iterations, following which $\mathcal{L}_{most}$, $\mathcal{L}_h$, and $\mathcal{L}_{face}$ are introduced.

For example, during the training, the models, or networks in the AI-based image processing system 102 are trained on a dataset. For example, for training the system 102 to generate human heads, the dataset may be a Flicker-Faces-High-Quality (FFHQ) dataset comprising high quality images of human faces. For example, the FFHQ dataset may include multitude, say more than 50,000 high-resolution images of portrait faces from varying age, ethnicity, and image conditions. After training, the models, or networks in the AI-based image processing system 102 are evaluated in the testing phase.

Some embodiments are based on an understanding that by incorporating the non-linear 3DMM via loss functions only, the photorealism provided by the StyleSDF architecture is maintained. The control is enforced during training of the StyleSDF architecture or the deep implicit function neural network 106 via the set of parametric consistency loss functions that incorporate disentangled latent parameters or attributes of the object encoder 402 using inverse rendering with image decoder of the object encoder 402.

For example, the model is evaluated for face generation, i.e., 2D image generation of 3D object based on provided attribute values and/or random attribute values, and subsequent editing, i.e., modifying a rendered image based on an input image or an input attribute value. In order to evaluate generation quality numerically, the capability of the system 102 to generate photorealistic images is compared with existing methods in terms of Frechet Inception Distance (FID). Further, to evaluate image editing, the capability of the system 102 to generate disentangled latent parameters in the latent space for shape, albedo, pose, illumination and hair/background and explicitly edit these properties is demonstrated and assessed.

Once the system 102, specifically, the networks or models within the system 102, are trained, tested, and evaluated, the system 102 may be deployed for synthetic image generation and/or image or synthetic editing applications.

Figure 9:
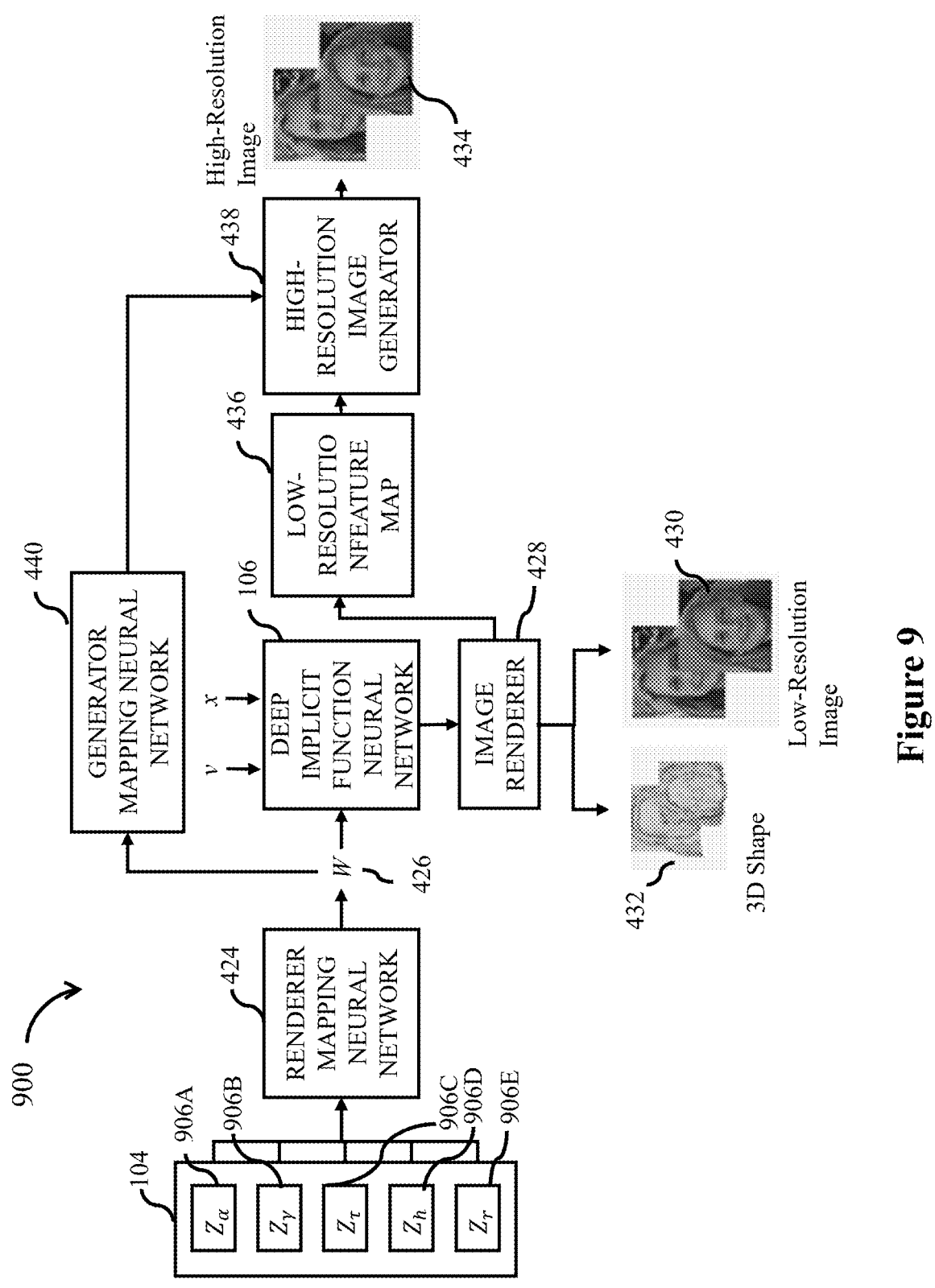
FIG. 9 illustrates an example block diagram of the AI-based image processing system, according to one or more embodiments.

Overview of an Example Implementation of an Artificial-Intelligence (AI) Image Processing System FIG. 9 illustrates an example block diagram 900 of the AI-based image processing system 102, according to some example embodiments. An objective of the system 102 is to combine the controllability of nonlinear 3DMMs with the photorealism of implicit 3D GANs.

Pursuant to the present example, an encoder of a nonlinear 3DMM, namely, MOST-GAN, and the architecture of an SDF-based implicit 3D GAN model, namely, StyleSDF, are combined to form the system 102. Further, the implicit 3D GAN model in the system 102 includes several components, as described in FIG. 5, including the deep implicit function neural network 106, an image renderer 428, and a high-resolution image generator 438. The deep implicit function neural network 106 and image renderer 428 comprise a signed distance function (SDF)-based volume renderer, and the high-resolution image generator 438 is a 2D style-based generative adversarial network (GAN). In an example, the deep implicit function neural network 106 is configured to generate an implicit 3D model of a volumetric representation of a 3D object. Moreover, the image renderer 428 is configured to render a 2D image of the 3D object based on the implicit 3D model generated by the deep implicit function neural network 106.

The system 102 further includes a renderer mapping neural network 424 and a generator mapping neural network 440 that are configured to produce encodings of latent parameters.

In operation, during the inference phase, the set of latent parameters 104 are received by the system. In an example, the set of latent parameters may be received or obtained from a database or the object encoder 402. For example, the object encoder 402 may generate the set of latent parameters 104 for different attributes of the 3D object in different images. To this end, the mapping relationship between the attributes and the set of latent parameters is known.

Further, the received set of latent parameters 104 may define representations of at least two attributes from a shape, $\alpha$, an albedo, $\tau$, an illumination, $\gamma$, a pose, $\theta$, and a background, h, of the 3D object in a reference image. In an example, the set of latent parameters 104 includes multiple subsets of latent parameters, depicted as 906A, 906B, 906C, 906D and 906E. For example, each latent parameter subset corresponds to one attribute of the object in the image. For example, the subset of latent parameters $Z_\alpha$ corresponds to the shape attribute $\alpha$, the subset of latent parameters $Z_\tau$ corresponds to the albedo attribute $\tau$, and the subset of latent parameters $Z_\gamma$ corresponds to the illumination or lighting attribute $\gamma$. In this manner, there may be multiple subsets of latent parameters corresponding to other attributes, such as pose, hair, background, etc.

Thereafter, the renderer mapping neural network 424 is configured to produce or generate a joint encoding, W 426, of the set of latent parameters. In an example, the joint encoding W 426 is a joint encoding of the latent parameters 104 that may be entangled but may be better suited for processing by the implicit 3D GAN. In an example, the joint encoding, W, is a learned intermediate latent space for representing the values of the attributes. In an example, the renderer mapping neural network 424 is configured to generate a reparameterization of a latent code to a new code that may better fit the properties expected by the generator mapping neural network 440. In an example, the renderer mapping neural network 424 is a nonlinear translation network that allows the disentangled representation of the latent parameters to map to an entangled representation corresponding to a representation of styleSDF. Based on the mapping of the disentangled representation to entangled representation for styleSDF, the join encoding is generated.

In an embodiment, the renderer mapping neural network 424 comprises a 3-layer MLP with LeakyReLU activation and is configured to map an input latent code Z into the space of W and then generates frequency modulation, $\gamma i$, and phase shift, $\beta i$, for each layer of the deep implicit function neural network 106.

The joint encoding, W, of the set of latent parameters is then transferred to the deep implicit function neural network 106. In an example, the deep implicit function neural network 106 additionally takes as input a 3D query point, x, and an input viewing direction, v; and maps them into an SDF value $d(x, z)$, a radiance $c(x, v, z)$, and a feature vector $f(x, v, z)$. The mapping of the input data, i.e., the query point, the viewing direction and the set of latent code parameters corresponding to different attributes to the feature vector is performed based a mapping relationship identified during the training.

In an example, based on the joint encoding, the deep implicit function neural network 106 may produce an implicit three-dimensional (3D) model of the object. For example, the implicit 3D model may characterize the whole embedding space on the object by classifying each 3D location as inside, outside, or on the surface of the object. In an example, the volumetric representation 908 defines a signed distance value and/or an optical density, as well as a color and/or a feature vector.

In one example, the image renderer 428 may use the deep implicit function neural network 106 to generate a low-resolution image, C, 430 and a low-resolution feature map F 436 using volume rendering and the input data, such as the joint encoding and the input viewing direction 108. For example, the low-resolution image is a 64×64 image. In an example, each pixel of the image C is computed by querying 3D points along a ray, r, indicated by r=o+tp originating from a camera position, o, and passing through a pixel location corresponding to a vector, p, as follows:

$$C(r) = \int_{t_f}^{t_n} T(t)\sigma\left(r(t)\right)c(r(t),\, p)dt \qquad (9)$$

Further, each pixel of the feature map is defined as follows:

$$F(r) = \int_{t_f}^{t_n} T(t)\sigma\left(r(t)\right)f(r(t),\, p)dt \qquad (10)$$

where $$T(t) = \exp\left(-\int_{t_f}^{t_n} \sigma(r(s))ds\right)$$

represents the visibility of each point along the ray. The density field $\sigma(x)$ is obtained from the SDF d(x) according to $$\sigma(x) = \frac{1}{\alpha} Sigmoid\left(\frac{-d(x)}{\alpha}\right),$$

where $\alpha$ is a learned attribute, i.e., the shape attribute to produce density field of 3D shape 916.

Further, the volumetric representation 908 is transferred to the high-resolution image generator 438. This style-based generative adversarial network (GAN) 438 is configured to map the low-resolution feature map F 436 into a high-resolution image, I 434, conditioned on a style-code g(W). The style code is produced by passing the joint representation W 426 into the generator mapping network, g 440. The role of the generator mapping neural network 440 is to convert the joint representation W 426 into a form that can be used as a style code that modulates the layers of the style-based GAN high-resolution image generator 438. The style-code is produced and fed into the image generator 438 by the generator mapping neural network 440. In an example, each component may have an accompanied generator mapping neural network 440 to map input latent vector into modulation signals for each layer.

To this end, the deep implicit function neural network 106 and the renderer mapping neural network 424 are trained using the SDF-based loss function $\mathcal{L}_{vol}$, and separately the styled image generator 438 and generator mapping neural network are trained using loss function $\mathcal{L}_{gen}$.

Figure 10A:
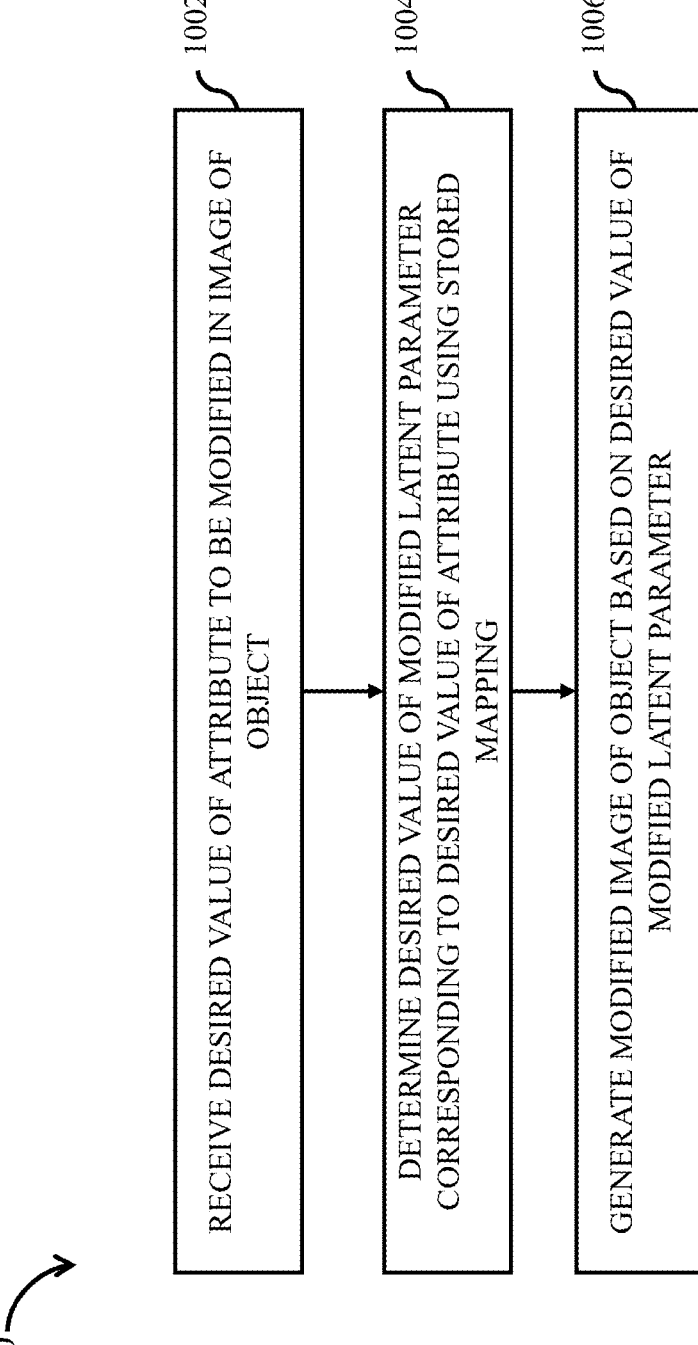
FIG. 10A illustrates an example flowchart of a method for modifying an image, according to one or more embodiments.

Overview of Use of the AI-Based Image Processing System for Modifying a Rendered Image FIG. 10A illustrates an example flowchart 1000 of a method for modifying an image, according to some embodiments.

In this regard, at 1002, a desired value of an attribute to be modified in an image of an object or a 3D object is received. In an example, the desired value of the attribute may be received as a desired numerical, alphabetic, or alphanumeric, value for the attribute. In another example, a desired image may be received from which the desired value of the attribute may be determined. In certain cases, the desired value of the attribute may correspond to a combination of attributes, say shape, and pose, or hair and shape.

At 1004, a desired value of the modified latent parameter is determined based on the desired value of the attribute using the stored mapping. For example, the stored mapping may indicate a relation between an attribute and its latent parameter in a latent space. Such mapping may be stored in a memory of the system. Specifically, the mapping may indicate a relation between values of the set of latent parameters 104 and corresponding values of the attributes of the object. To this end, based on an attribute, say shape, $\alpha$, of the image to be modified, its latent parameter, i.e., $Z_\alpha$, may be modified based on a mapping between stored values of $\alpha$ and $Z_\alpha$ for the object.

In an example, different 3D objects may have different nature of mapping between a corresponding attribute and its latent parameter. To this end, during the training the mapping between the values of the attribute in multiple training images and the values of the latent parameter may be analyzed to extract the mapping relationship.

Thereafter, at 1006, a modified image of the object is generated based on the desired value of the modified latent parameter. For example, using the modified latent parameter for the attribute and previously used or unmodified latent parameters for remaining attributes or remaining latent parameters from the set of latent parameters 104, the modified image is generated. As the change in the image related to only an attribute, therefore, the other attributes of the image are not affected or are only minimally affected by the change.

Figure 10B:
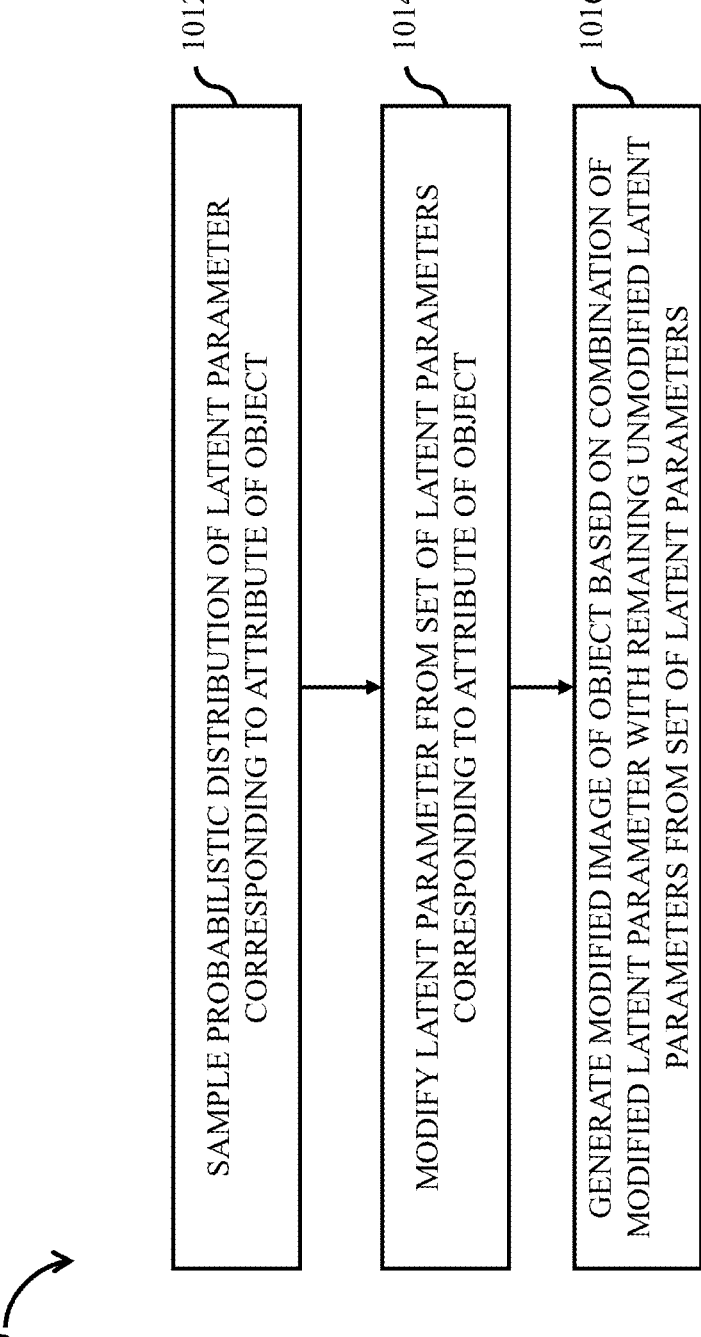
FIG. 10B illustrates another example flowchart of a method for modifying an image, according to one or more embodiments.

FIG. 10B illustrates another example flowchart 1010 of a method for modifying an image, according to some embodiments.

In this regard, at 1012, a probabilistic distribution of a latent parameter corresponding to an attribute is sampled. For example, the attribute needs to be modified to produce a modified image. In this regard, the value of the attribute of an object in a currently rendered image is sampled.

Further, at 1014, the latent parameter from the set of latent parameters corresponding to the attribute of the object is modified. In an example, the probabilistic distribution of a value of the latent parameter of the attribute is modified to change the value of the latent parameter based on a desired value.

Thereafter, at 1016, a modified image of the object is generated based on combination of modified latent parameter with remaining unmodified latent parameters from set of latent parameters.

While the present examples disclose editing or modifying images using the system 102. In other examples, the system 102 can be used to generate a new image, such as a synthetic image. In this regard, the system 102, the deep implicit function neural network 106 or the object encoder 402 may define random values for the attributes or the latent parameters, based on a type of object to be generated. Based on the random values the new image is generated.

In certain other cases, an input image may be fed to the system 102, where certain attributes of the input image may have to be mimicked in the new image. In this case, the object encoder 402 may generate encodings of the attributes of the input image. Based on the attribute(s) to be used, encoding or value of those attribute(s) may be retrieved and used to generate corresponding latent parameter. For example, if the shape of the input image is to be mimicked, then the value of shape attribute of the object in the input image may be retained. This retained value can be used to generate the latent parameter for shape. Further, random values would be used for other attributes, such as pose, illumination, hair/background, etc. Based on the pre-defined value of latent parameter for shape and random values of latent parameters of other attributes, the new image is generated.

Once the new image is generated, it can be controlled progressively to modify different, such as one or multiple, attributes in one or multiple iterations.

Figure 11A:
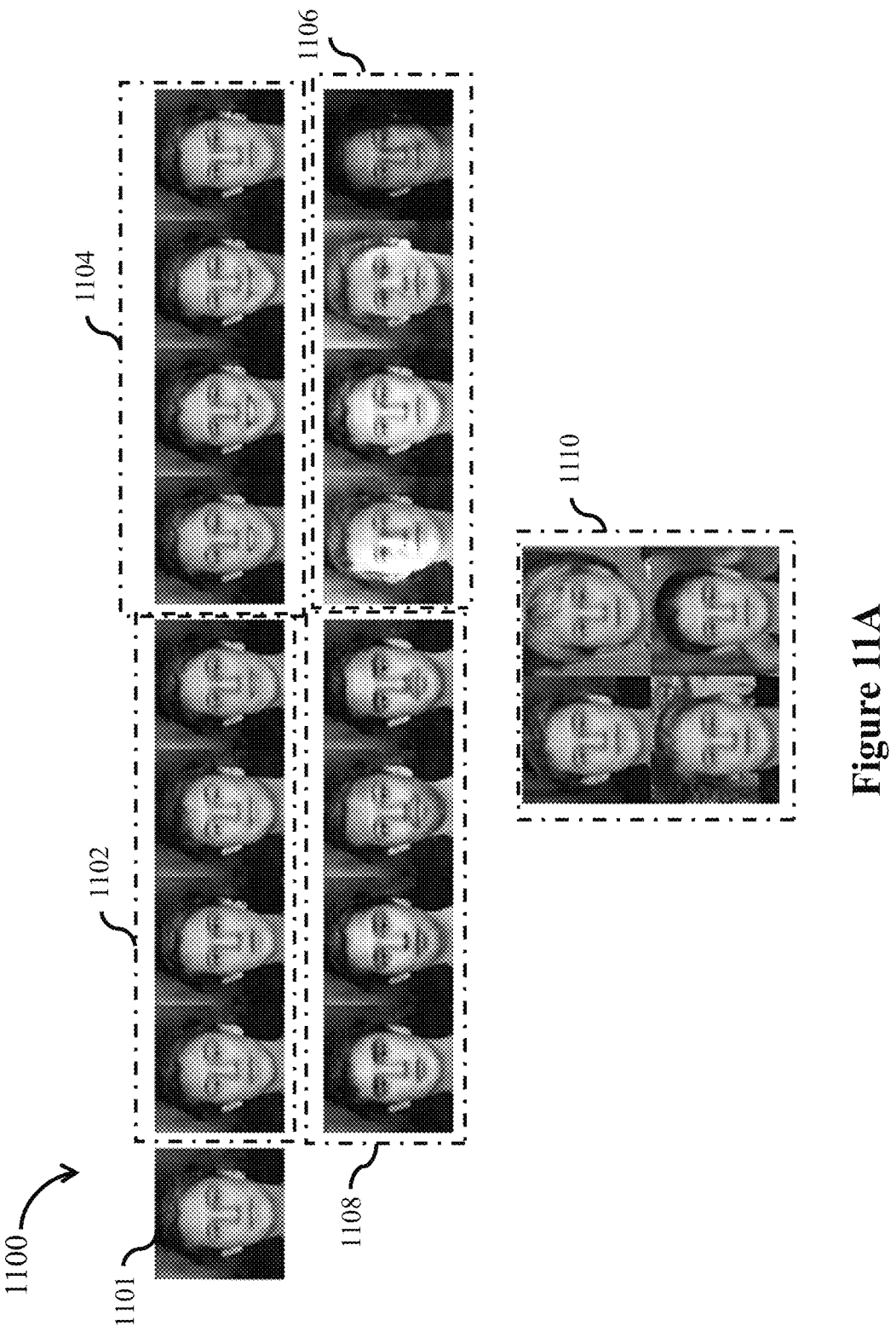
FIG. 11A illustrates an example set of AI-modified images, according to one or more embodiments.

Overview of Effectiveness of Generation or Modification of Images Using the AI-Based Image Processing System FIG. 11A illustrates an example set of AI-modified images 1110, according to some embodiments.

The controllable latent StyleSDF neural network disclosed in the present disclosure combines the controllability of physical attributes afforded by 3DMM-based approaches with the high-quality generative capability of implicit 3D-GANs. The set of images 1100 can be manipulated independently across shapes, expressions, albedos, illumination conditions as well as hairstyles and backgrounds.

For example, multiple modified images 1102 and 1104 are shown with different face shapes. Starting with the latent parameters that were used to generate an initial generated image 1101, the shape latent parameter, $Z_\alpha$, of an image is modified across various values to generate the modified images 1102. For example, in the modified images 1102 the 3D shape is modified such that the object (or face) images look like they belong to different people. On the other hand, in 1104 the shape parameter, $Z_\alpha$, of the image 1101 is modified across various values to obtain modified images 1104 such that the object (or face) looks like it has different facial expressions.

Further, modified images 1106 are generated by changing the illumination parameter, $Z_\gamma$, of the image 1101 across different values, and modified images 1108 are generated by changing the albedo parameter, $Z_\tau$, of the image 1101 across different values. Moreover, modified images 1110 are generated by changing the latent parameter for hair and background, $Z_h$, of the image 1101 across different values.

Figure 11B:
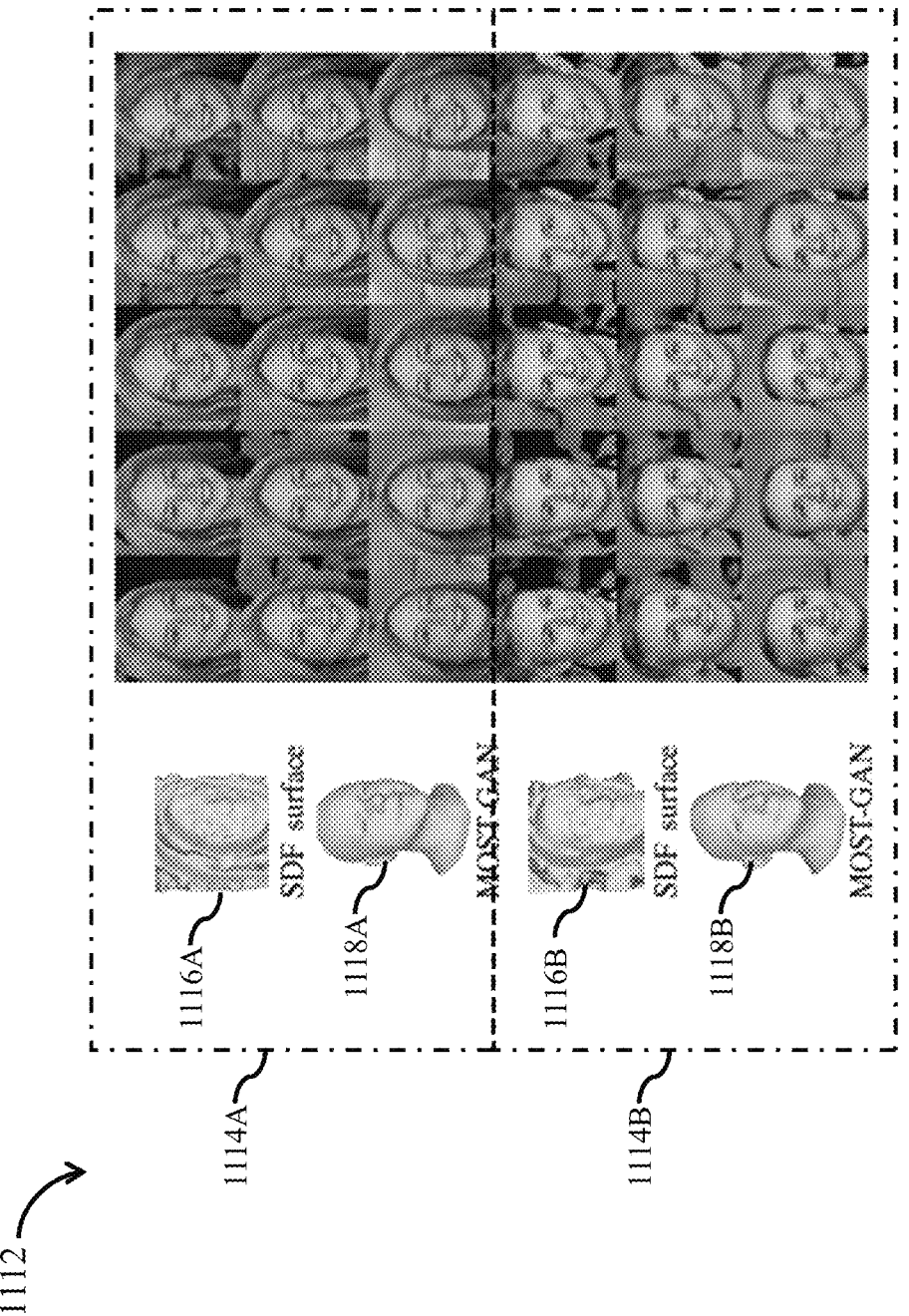
FIG. 11B illustrates an example set of AI-generated images, according to one or more embodiments.

FIG. 11B illustrates an example set of AI-generated images 1112, according to some embodiment.

The set of images 1112 includes images from multiple viewpoints. For example, the images 1112 are synthesized in a view-consistent manner which renders two randomly generated faces 1114A and 1114B in different viewpoints up to ±0.45 radians azimuth and ±0.225 radians elevation. To demonstrate the quality of the underlying 3D surfaces, marching cubes meshes 1116A and 1116B obtained from the signed distance field are illustrated. In addition, for each example, the latent code for shape $Z_\alpha$ is mapped to the attribute value of α generated by the object encoder, and the mapping is based on the equation (1). In this manner, the 3D meshes 1118A and 1118B corresponding to the shape attribute value of α are generated using the MOST-GAN decoder. To this end, the multi-view images for the faces 1114A and 1114B are each generated using the corresponding values of the latent code for shape $Z_\alpha$ and fixed values of the other object parameters, but varying the values of the pose parameter.

Figure 11C:
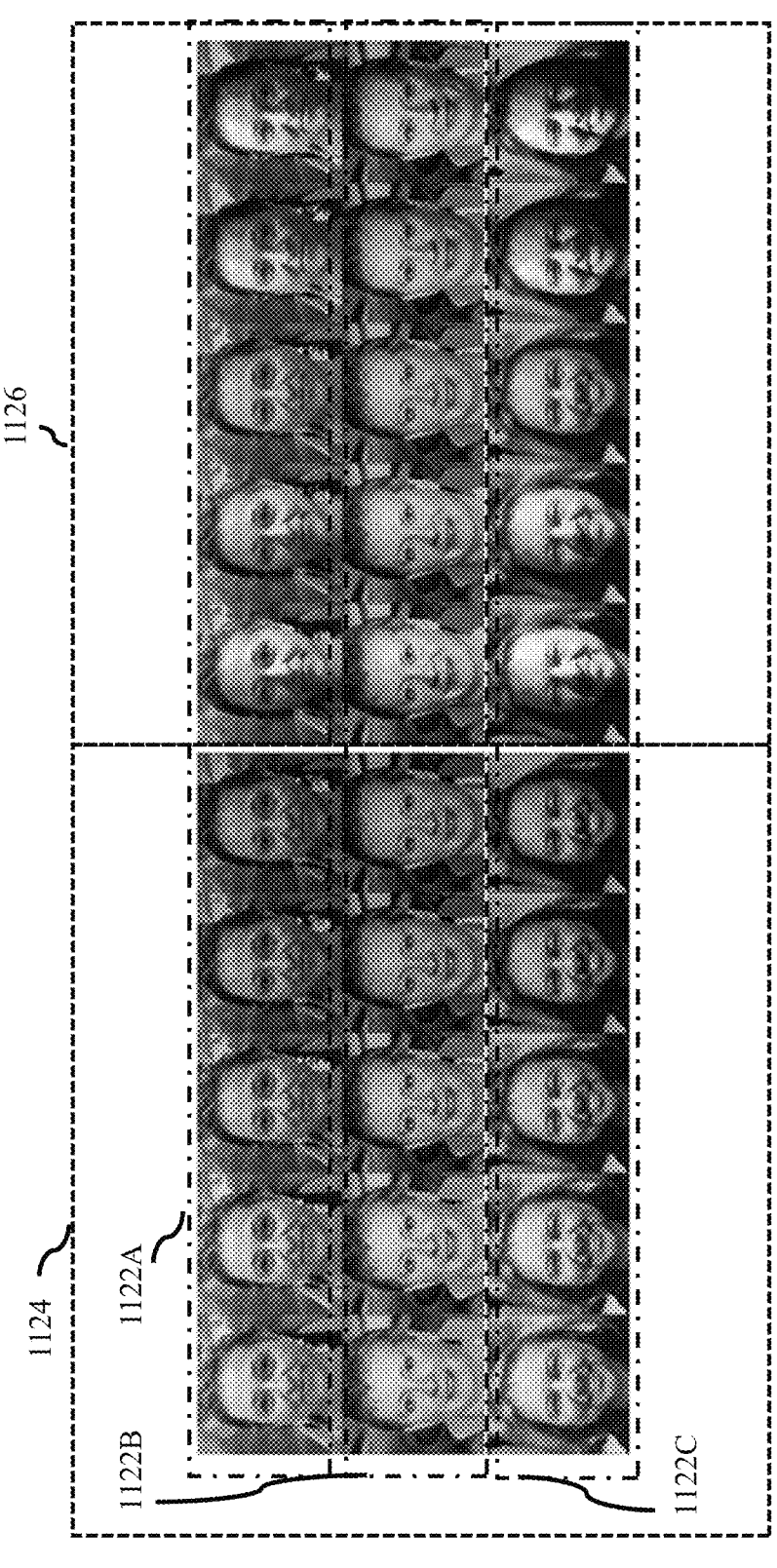
FIG. 11C illustrates an example set of AI-modified images, according to one or more embodiments.

FIG. 11C illustrates an example set of AI-modified images 1120, according to some embodiments. In accordance with the present example, the illumination attribute, γ, is edited using spherical harmonics. Herein, for three randomly generated faces (depicted as faces 1122A, 1122B and 1122C), the lighting is changed or altered by directly modifying the spherical harmonics coefficients.

By varying a first spherical harmonics coefficient, a level of global (ambient) illumination is controlled in the images 1124. Further, by varying a second spherical harmonics coefficient, the horizontal directionality of illumination is controlled in the images 1126.

FIG. 12A, FIG. 12B, FIG. 12C and FIG. 12D illustrate AI-modified images based on attributes from source images, according to various embodiments. In the FIG. 12A, shape, a, from sources images 1202A is transferred to target images 1204A using shape latent parameter, $Z_\alpha$.

Figures 12A, 12B:
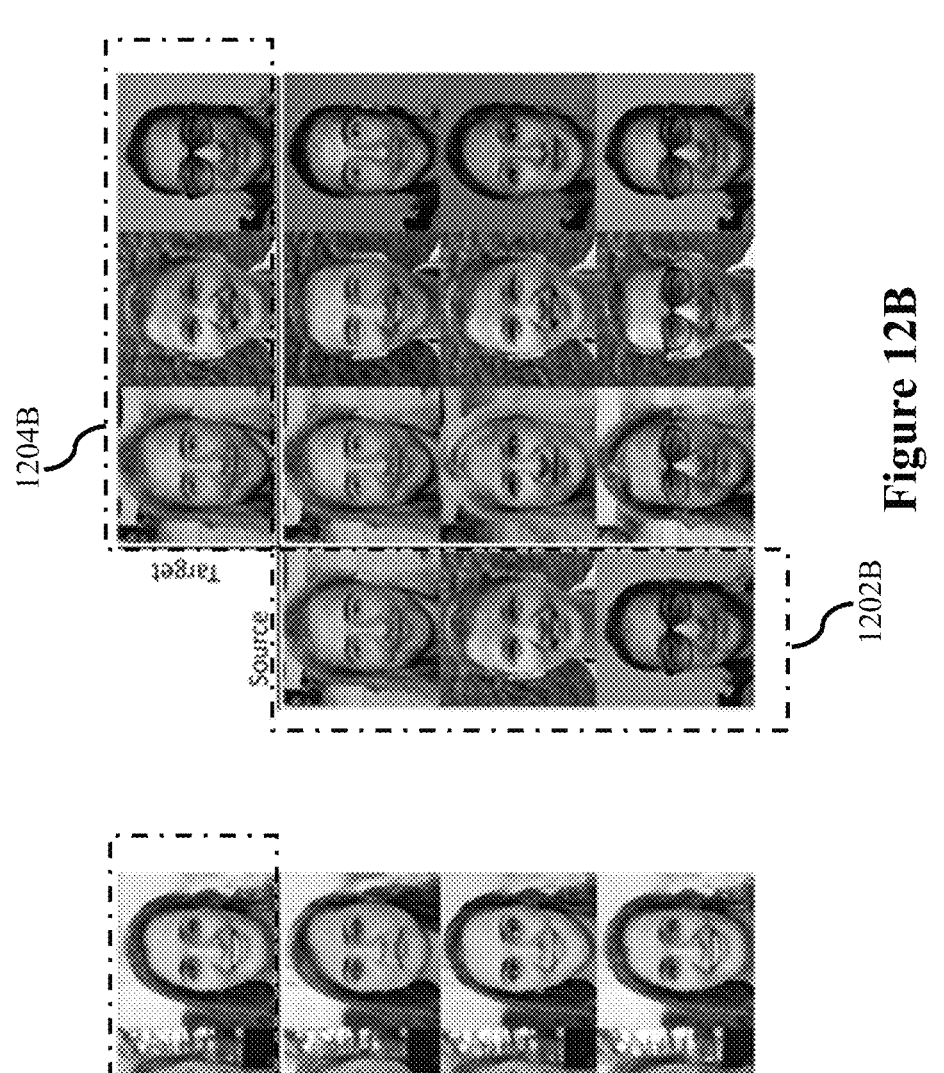
FIG. 12A, FIG. 12B, FIG. 12C and FIG. 12D illustrate AI-modified images based on attributes from source images, according to various embodiments.
Figure 12D:
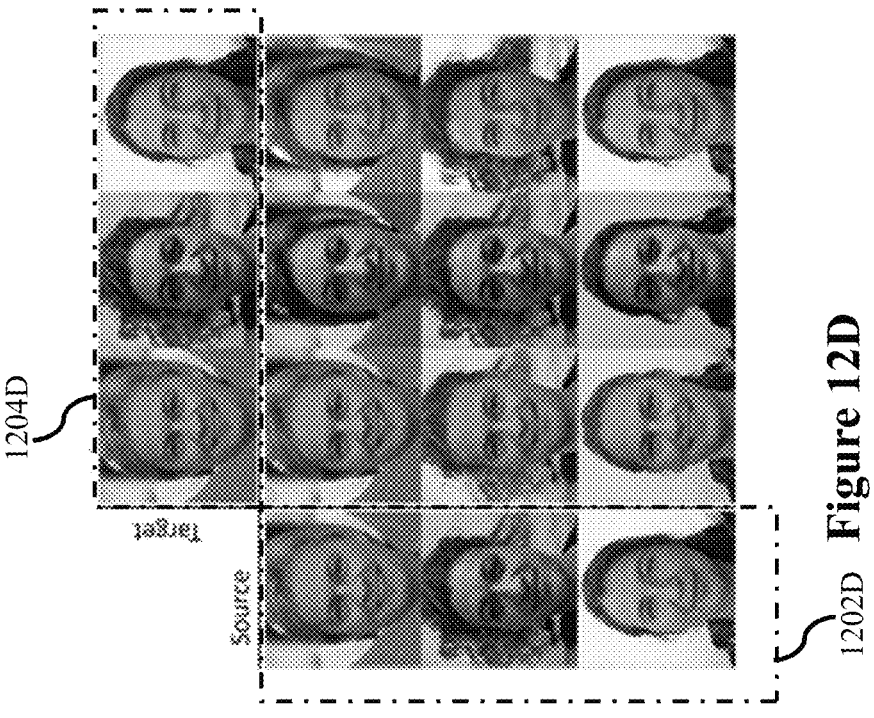
Figure 12C:
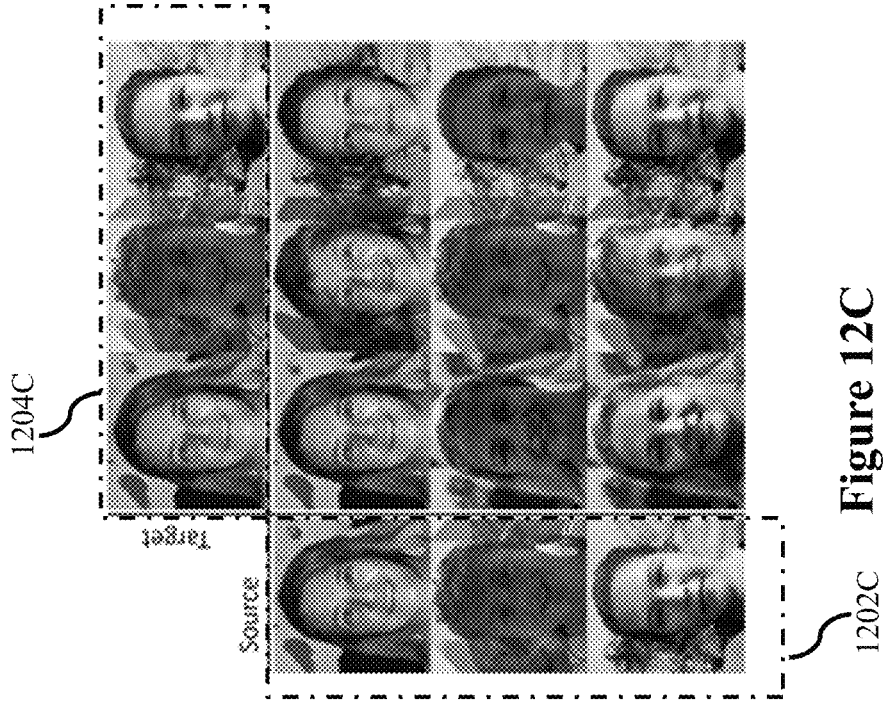

Referring to FIG. 12B, albedo, τ, from sources images 1202B is transferred to target images 1204B using albedo latent parameter, $Z_\tau$. Further, in the FIG. 12C, lighting or illumination, γ, from sources images 1202C is transferred to target images 1204C using albedo latent parameter, $Z_\gamma$. In the FIG. 12D, hair or background, h, from sources images 1202D is transferred to target images 1204D using background latent parameter, $Z_h$. To this end, the transfer of the physical attributes from the source images 1202A, 1202B, 1202C and 1202D to the target images 1204A, 1204B, 1204C and 1204D demonstrates disentanglement of the latent codes or latent parameters for the neural network.

Exemplary Implementation

Figure 13:
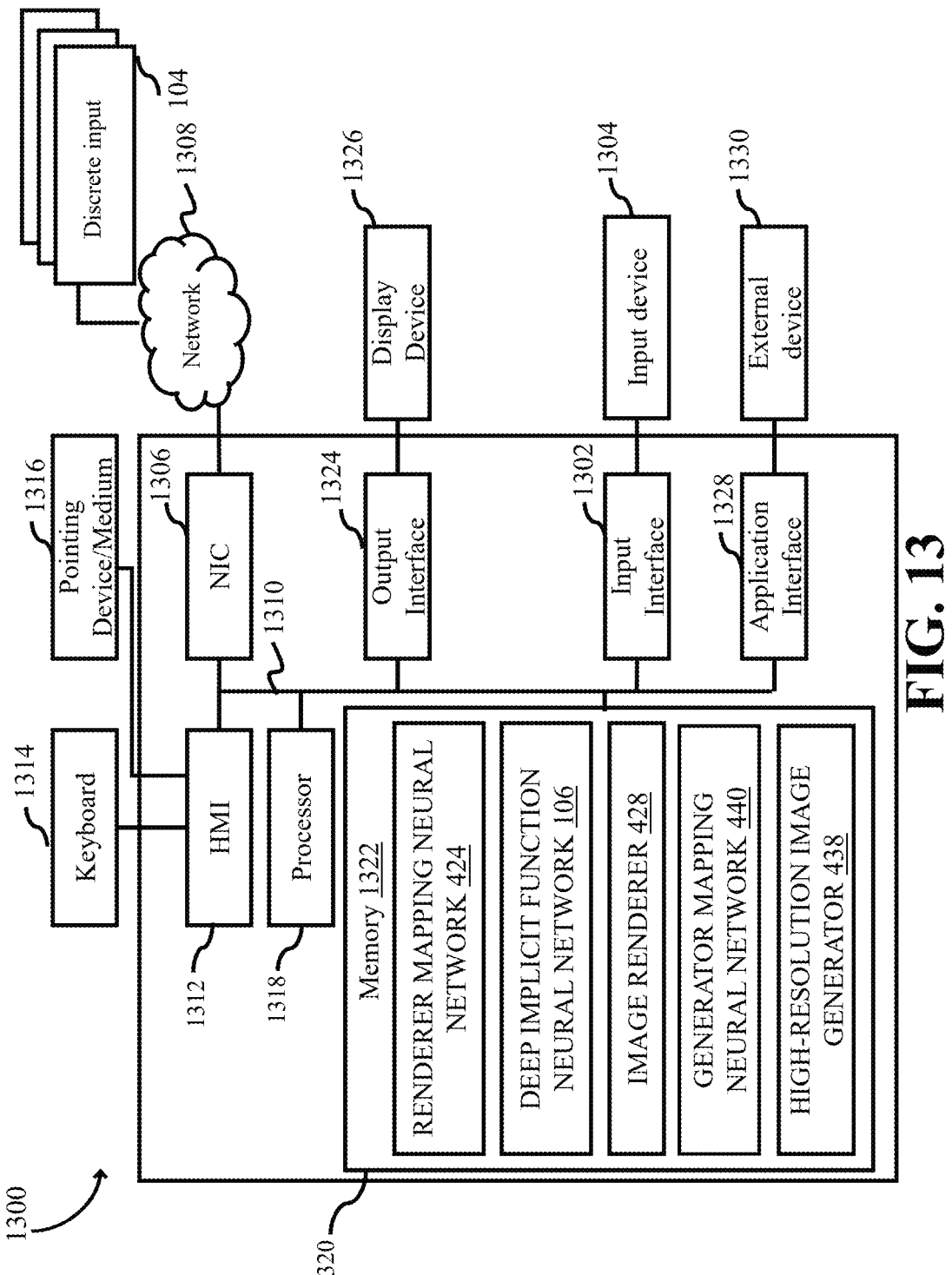
FIG. 13 illustrates a block diagram of a computer-based AI-based image processing system for generating an image of a scene, in accordance with an example embodiment.

FIG. 13 illustrates a block diagram 1300 of a computer-based AI-based image processing system 102 (referred to as system, hereinafter) for generating an image 110 of a scene, in accordance with an example embodiment. The system 102 includes a number of interfaces connecting the system 102 with other systems and devices. The system 102 includes an input interface 1302 configured to accept attributes of a 3D object and a set of latent parameters 104 corresponding to generation of the image.

In some embodiments, the system 102 includes a network interface controller (NIC) 1306 configured to obtain the set of latent parameters 104, via a network 1308, which can be one or combination of wired and wireless network. The network interface controller (NIC) 1306 is adapted to connect the system 102 through a bus 910 to the network 908 connecting the system 102 with an input device 1304. The input device 1304 may correspond to a database or a user device that stores the set of latent parameters 104 or the image 404 to be provided to the system 102 to generate and render 3D volumetric representation as an output image.

Additionally, or alternatively, the system 102 may include a human machine interface (HMI) 1312. The human machine interface 1312 within the system 102 connects the system 102 to a keyboard 1314 and pointing device 1316, where the pointing device 1316 may include a mouse, trackball, touchpad, joystick, pointing stick, stylus, or touchscreen, among others.

The system 102 includes a processor 1318 configured to execute stored instructions 1320, as well as a memory 1322 that stores instructions that are executable by the processor 1318. The processor 1318 can be a single core processor, a multi-core processor, a computing cluster, or any number of other configurations. The memory 1322 can include random access memory (RAM), read only memory (ROM), flash memory, or any other suitable memory systems. The processor 1318 may be connected through the bus 1310 to one or more input and output devices.

The instructions 1320 may implement a method for generating for generating and rendering an image of a scene including an object viewed from one or multiple viewing directions, according to some embodiments. To that end, computer memory 1322 stores the renderer mapping neural network 424, deep implicit function neural network 106, image renderer 428, generator mapping neural network 440, and high-resolution image generator 438.

The renderer mapping neural network 424 is configured to generate the joint encoding 426 based on the set of latent parameters 104 defining representations of the at least two attributes 810 of the object in the image 830. The deep implicit function neural network 106 and the image renderer 428 are configured to generate one or more of one or more low-resolution images 430, a low-resolution feature map 436 and one or more low-resolution signed distance function (SDF) surfaces, based on the input viewing direction, r and the joint encoding, W, 426 of the set of latent parameters 104. Further, the generator mapping neural network 440 is configured to convert the joint representation, W, 426 into a style code that modulates the high-resolution image generator 438. The high-resolution image generator 438 is configured to render the high-resolution 2D image 434 of the scene including the object viewed from the input viewing direction.

In some embodiments, an output interface 1324 may be configured to render the output, i.e., high-resolution 2D image 434 of the scene including the object viewed from the input viewing direction, on a display device 1326. Examples of the display device 1326 include a computer monitor, television, projector, or mobile device, among others. The system 102 can also be connected to an application interface 1328 adapted to connect the system 102 to an external device 1330 for performing various tasks.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, it can be understood by one of ordinary skill in the art that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What claimed is:

1. An artificial intelligence (AI) image processing system for generating and rendering an image of a scene including an object viewed from one or multiple viewing directions, the AI image processing system comprising: at least one processor and a memory having instructions stored thereon that cause the at least one processor of the AI image processing system to:

receive a set of latent parameters defining representations of at least two attributes of a shape, an albedo, an illumination, a pose, and a background of the object in the image, wherein the set of latent parameters includes multiple subsets of latent parameters, wherein each latent parameter subset corresponds to one of the at least two attributes of the object in the image;

submit the set of latent parameters into a renderer mapping neural network trained to produce a joint encoding of the set of latent parameters;

submit the joint encoding to a deep implicit function neural network trained to produce, given the joint encoding, an implicit three-dimensional (3D) model of the object defining a volumetric representation for each 3D location in the scene including the object with respect to an input viewing direction, wherein the volumetric representation defines one or a combination of a signed distance value and an optical density, and one or a combination of a color and a feature vector; and submit the volumetric representations produced for different 3D locations in the scene to an image renderer configured to render a 2D image of the scene including the object viewed from the input viewing direction, wherein the processor is configured to execute modules of the AI image processing system comprising:

the renderer mapping neural network configured to generate the joint encoding based on the set of latent parameters defining representations of the at least two attributes of the object in the image;

the deep implicit neural network and image renderer configured to generate one or more of one or more low-resolution images, a low-resolution feature map and one or more low-resolution signed distance function (SDF) surfaces, based on the input viewing direction and the joint encoding of the set of latent parameters;

the generator mapping neural network configured to convert the joint representation into a style code that modulates a high-resolution image generator; and the high-resolution image generator configured to render the high-resolution 2D image of the scene including the object viewed from the input viewing direction.

2. The AI image processing system of claim 1, wherein, to modify an attribute of the object in the 2D image of the scene, the processor is configured to:

modify a latent parameter from the set of latent parameters corresponding to the attribute of the object; and generate a modified image of the object based on a combination of the modified latent parameter with the remaining unmodified latent parameters from the set of latent parameters.

3. The AI image processing system of claim 2, wherein, to modify the attribute of the object, the processor is configured to:

sample a probabilistic distribution of the latent parameter corresponding to the attribute of the object to produce the modified latent parameter.

4. The AI image processing system of claim 2, wherein the memory stores a mapping between values of the set of latent parameters and corresponding values of the attribute of the object, and wherein, to modify the attribute of the object, the processor is configured to:

receive a desired value of the attribute to be modified in the image of the object; and determine a desired value of the modified latent parameter corresponding to the desired value of the attribute using the stored mapping.

5. The AI image processing system of claim 4, wherein the mapping is based on a statistical analysis of the distribution of images in a dataset.

6. The AI image processing system of claim 5, wherein the mapping is derived using principal components analysis (PCA) of values of the attribute in a dataset of training images of the object.

7. The AI image processing system of claim 2, wherein the processor is configured to:

obtain the modified latent parameter to match parameters of an input image by using an object encoder, wherein the object encoder is configured to determine a numerical value of the corresponding attribute in the input image.

8. The AI image processing system of claim 2, wherein the processor is configured to:

train the deep implicit function neural network using an object encoder that determines numerical values of attributes from a training image of a training object.

9. The AI image processing system of claim 8, wherein the processor is configured to:

train the deep implicit function neural network using the object encoder based on a set of parametric consistency loss functions to enforce consistency between the received set of latent parameters for generating the image of a scene and parameters that encode attributes of the rendered 2D image of the scene.

10. The AI image processing system of claim 8, wherein the processor is configured to:

train the deep implicit function neural network using the object encoder based on a set of image-based consistency loss functions to minimize a correlation between a latent parameter relating to the background of the training object and an appearance of the training object, and to minimize a correlation between a latent parameter relating to the appearance of the training object and the appearance of the background of the training object.

11. The AI image processing system of claim 8, wherein the object is a human head.

12. The AI image processing system of claim 11, wherein the processor is configured to:

train the deep implicit function neural network using the object encoder based on a set of image-based consistency loss functions to minimize a correlation between a latent parameter or the set of latent parameters relating to hair and background of the human head and an appearance of a face, and to minimize a correlation between a latent parameter or the set of latent parameters relating other attributes of the human head and the appearance of the hair and background of the human head.

13. The AI image processing system of claim 11, wherein the processor is configured to:

partition a multi-dimensional latent code of the scene into the set of latent parameters defining representations of at least two attributes of the object in the image; and introduce an additional latent parameter as part of the set of latent parameters, the additional latent parameter defining variable representation of a facial appearance factor of the human head.

14. The AI image processing system of claim 1, wherein the high-resolution image generator is configured to render a high-resolution 2D image of the scene including the object viewed from the input viewing direction, instead of or in addition to the 2D image of the scene rendered by the image renderer.

15. The AI image processing system of claim 1, wherein the shape attribute represents a 3-dimensional (3D) shape of the object, and the pose attribute represents a pose of the object in 3D space.

16. The AI image processing system of claim 1, wherein the lighting attribute utilizes a spherical harmonics representation.

17. The AI image processing system of claim 1, wherein the deep implicit function neural network is one of: a signed distance function (SDF) neural network, a neural radiance field (NeRF) neural network, or a Gaussian splatting neural network.

18. A method for generating and rendering an image of a scene including an object viewed from one or multiple viewing directions, the method comprising:

receiving a set of latent parameters defining representations of at least two attributes of a shape, an albedo, an illumination, a pose, and a background of the object in the image, wherein the set of latent parameters includes multiple subsets of latent parameters, wherein each latent parameter subset corresponds to one of the at least two attributes of the object in the image;

submitting the set of latent parameters into a renderer mapping neural network trained to produce a joint encoding of the set of latent parameters;

submitting the joint encoding to a deep implicit function neural network trained to produce, given the joint encoding, an implicit three-dimensional (3D) model of the object defining a volumetric representation for each 3D location in the scene including the object with respect to an input viewing direction, wherein the volumetric representation defines one or a combination of a signed distance value and an optical density, and one or a combination of a color and a feature vector;

submitting the volumetric representations produced for different 3D locations in the scene to an image renderer configured to render on a display device a 2D image of the scene including the object viewed from the input viewing direction;

generating, via the renderer mapping neural network, the joint encoding based on the set of latent parameters defining representations of the at least two attributes of the object in the image;

generating, via the deep implicit neural network and image renderer, one or more of one or more low-resolution images, a low-resolution feature map and one or more low-resolution signed distance function (SDF) surfaces, based on the input viewing direction and the joint encoding of the set of latent parameters;

converting, via the generator mapping neural network, the joint representation into a style code that modulates a high-resolution image generator; and rendering, via the high-resolution image generator, the high-resolution 2D image of the scene including the object viewed from the input viewing direction.

19. A non-transitory computer readable storage medium embodied thereon a program executable by a processor for performing a method, the method comprising:

receiving a set of latent parameters defining representations of at least two attributes of a shape, an albedo, an illumination, a pose, and a background of the object in the image, wherein the set of latent parameters includes multiple subsets of latent parameters, wherein each latent parameter subset corresponds to one of the at least two attributes of the object in the image;

submitting the set of latent parameters into a renderer mapping neural network trained to produce a joint encoding of the set of latent parameters;

submitting the joint encoding to a deep implicit function neural network trained to produce, given the joint encoding, an implicit three-dimensional (3D) model of the object defining a volumetric representation for each 3D location in the scene including the object with respect to an input viewing direction, wherein the volumetric representation defines one or a combination of a signed distance value and an optical density, and one or a combination of a color and a feature vector;

submitting the volumetric representations produced for different 3D locations in the scene to an image renderer configured to render on a display device a 2D image of the scene including the object viewed from the input viewing direction;

generating, via the renderer mapping neural network, the joint encoding based on the set of latent parameters defining representations of the at least two attributes of the object in the image;

generating, via the deep implicit neural network and image renderer, one or more of one or more low-resolution images, a low-resolution feature map and one or more low-resolution signed distance function (SDF) surfaces, based on the input viewing direction and the joint encoding of the set of latent parameters;

converting, via the generator mapping neural network, the joint representation into a style code that modulates a high-resolution image generator; and rendering, via the high-resolution image generator, the high-resolution 2D image of the scene including the object viewed from the input viewing direction.

* * * * *